United States Patent [19]
Kinto et al.

[11] Patent Number: 6,142,252
[45] Date of Patent: Nov. 7, 2000

[54] AUTONOMOUS VEHICLE THAT RUNS WHILE RECOGNIZING WORK AREA CONFIGURATION, AND METHOD OF SELECTING ROUTE

[75] Inventors: Yasuhisa Kinto, Amagasaki; Kyoko Nakamura, Toyonaka; Yuichi Kawakami, Itami; Nobukazu Kawagoe, Toyonaka, all of Japan

[73] Assignee: Minolta Co., Ltd., Osaka, Japan

[21] Appl. No.: 08/892,848

[22] Filed: Jul. 11, 1997

[30] Foreign Application Priority Data

| Jul. 11, 1996 | [JP] | Japan | 8-182060 |
| Sep. 25, 1996 | [JP] | Japan | 8-253028 |

[51] Int. Cl.$^7$ ............................................. B60S 9/00
[52] U.S. Cl. ................... 180/204; 180/274; 318/568.12; 318/568.16; 901/3
[58] Field of Search ....................... 180/204, 167, 180/168, 169, 6.5, 274, 279, 280; 701/23, 25, 28; 318/568.12, 568.13, 568.16; 901/1, 3, 10

[56] References Cited

U.S. PATENT DOCUMENTS

| 5,400,244 | 3/1995 | Watannabe et al. | 701/28 |
| 5,440,216 | 8/1995 | Kim | 318/587 |
| 5,545,960 | 8/1996 | Ishikawa | 318/587 |
| 5,548,511 | 8/1996 | Bancroft | 701/23 |
| 5,717,484 | 2/1998 | Hamaguichi et al. | 356/3.12 |
| 5,720,077 | 2/1998 | Nakamura et al. | 15/340.1 |

FOREIGN PATENT DOCUMENTS

| 63-286911 | 5/1987 | Japan . |
| 6-242825 | 2/1993 | Japan . |
| 7-319542 | 5/1994 | Japan . |

*Primary Examiner*—Robert J. Oberleitner
*Assistant Examiner*—Pamela J. Lipka
*Attorney, Agent, or Firm*—McDermott, Will & Emery

[57] ABSTRACT

When an autonomous vehicle detects an interruption in a wall, a plurality of optical distance measurement sensors provided in a driving unit measures the distance to a plurality of points of an object of interest located ahead. The configuration of the object of interest located ahead is recognized from the obtained distance information and from the attached angle of each optical distance measurement sensor to determine the subsequent operation of the autonomous vehicle.

11 Claims, 33 Drawing Sheets

FIG.8
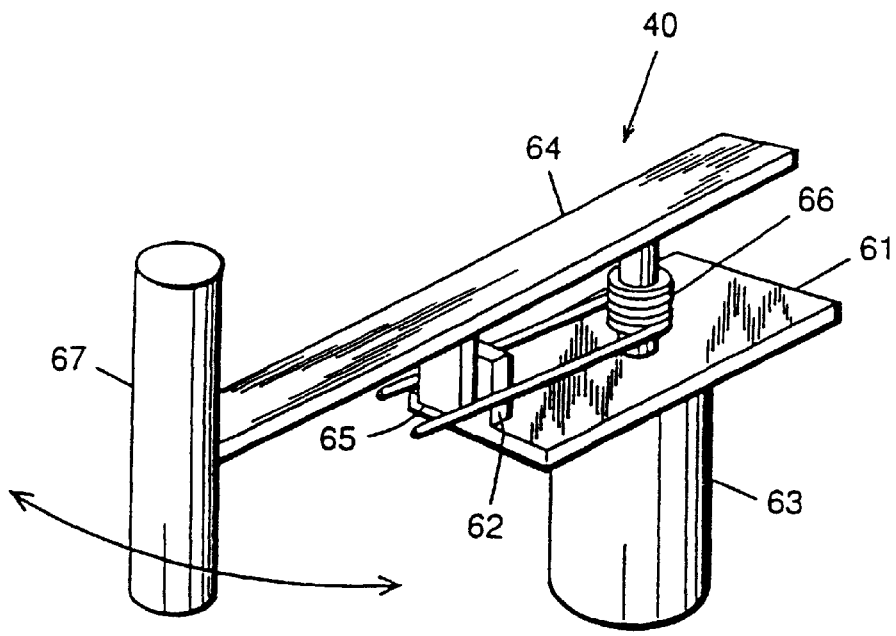
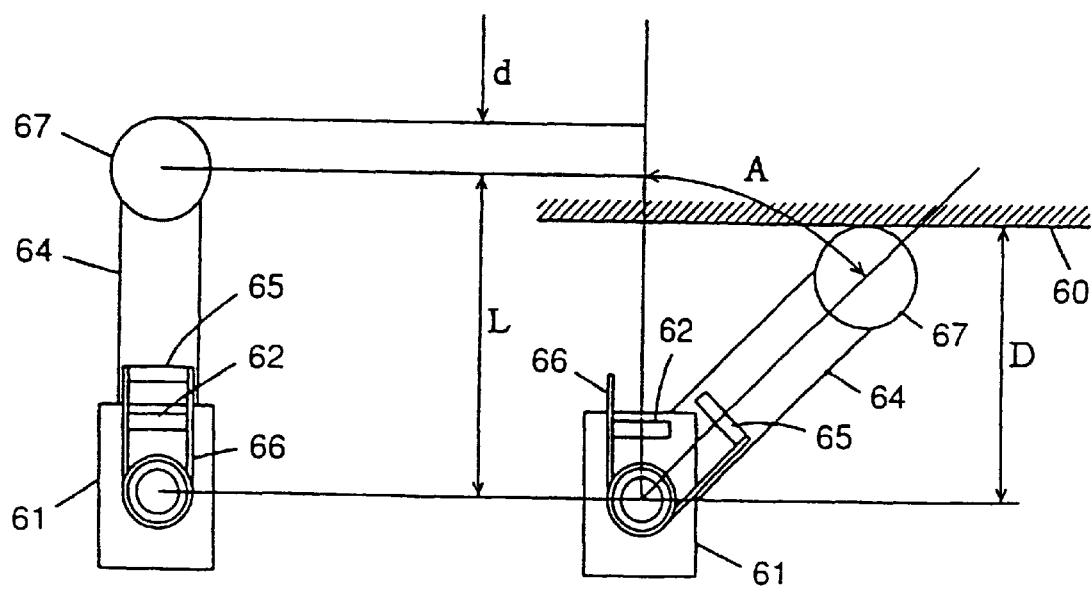
FIG.9A    FIG.9B

FIG.10A
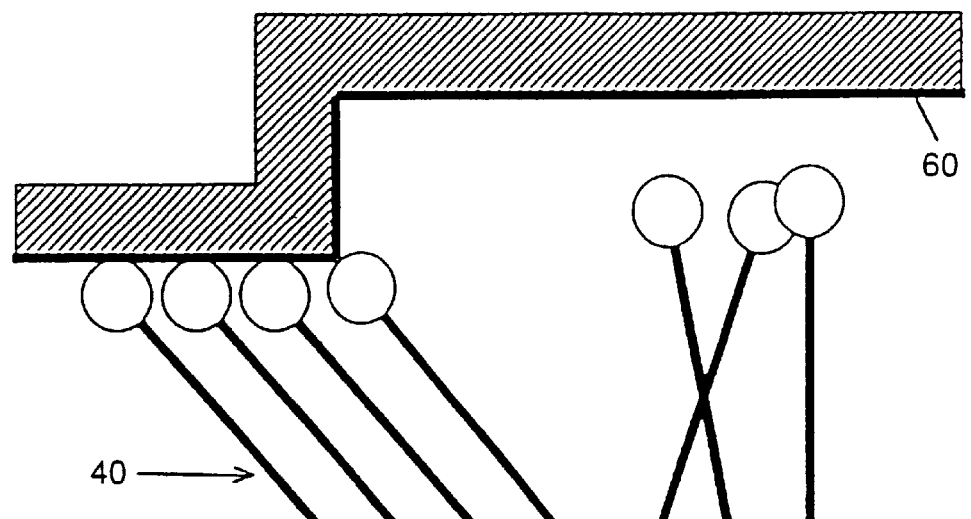
FIG.10B
FIG.10C

AUTONOMOUS VEHICLE THAT RUNS WHILE RECOGNIZING WORK AREA CONFIGURATION, AND METHOD OF SELECTING ROUTE

BACKGROUND OF THE INVENTION

1. Field of the Invention

The present invention relates to autonomous vehicles that run in a work area. More particularly, the present invention relates to an autonomous vehicle that can run while recognizing the configuration of a work area.

2. Description of the Related Art

Various types of autonomous vehicles that travel autonomously while detecting the presence of an obstruction in the neighborhood are developed. An autonomous vehicle that carries out a predetermined work, for example scavenger, transportation, and the like while running along an object of interest such as a wall has been developed. One type of a conventional autonomous vehicle is disclosed in, for example, Japanese Patent Laying-Open No. 6-242825. Control is provided so that this conventional autonomous vehicle can run even when there is an interruption in a sidewall which is the object of interest such as in the case of a crossroads.

FIGS. 1 and 2 are diagrams for describing the problems of such a conventional autonomous vehicle. It is assumed that a conventional autonomous vehicle 300 travels in a trace-manner with a sidewall as a reference. When conventional autonomous vehicle 300 detects an interruption in a wall 301 during the tracer-travel, autonomous vehicle 300 will continue to run until a reference plane that allows tracer travel is detected. Therefore, autonomous vehicle 300 continues to run so as to collide with a wall plane 302 ahead even in the case where there is no wall plane on the line of extension of that followed wall plane 301.

Control is provided so that autonomous vehicle 300 stops running when no reference plane that allows tracer travel is detected at an elapse of a predetermined time from detection of interruption in a wall 303. When wall 304 is farther away from wall 303 by more than a predetermined distance as shown in FIG. 2, autonomous vehicle 300 will stop during the procedure to disable subsequent travel.

An autonomous vehicle that runs in a zigzag manner within a rectangle region is known. First, this zigzag travel will be described.

FIG. 3A is a diagram for describing the route of an autonomous vehicle when the direction of travel at a starting point A is parallel to the shorter side of the rectangle region. FIG. 3B is a diagram for describing the route of an autonomous vehicle when the direction of travel at starting point A is parallel to the longer side of the rectangle region.

Referring to FIG. 3A, the autonomous vehicle that begins to run straight forward from location point A in a direction parallel to the shorter side of the rectangle region arrives at location point B. The autonomous vehicle rotates 90 degrees clockwise at location point B to proceed a short distance straight forward up to location point C. The autonomous vehicle rotates 90 degrees clockwise at location point C to further proceed straight forward towards location point D. Then, the autonomous vehicle rotates 90 degrees counterclockwise and proceeds straight forward at respective location points D and E.

By repeating the movement of proceeding straight forward and turning 90 degrees as described above, the autonomous vehicle will run in a zigzag manner all over the rectangle region.

FIG. 3B shows the zigzag travel proceeding straight forward from a starting point A' in a direction parallel to the longer side of the rectangle region. The autonomous vehicle begins to run from point A' through points B', C', D' and E' to arrive at location point F'. By repeating the movement of proceeding straight forward and turning 90 degrees similar to that of FIG. 3A, the autonomous vehicle will cover the rectangle region in a zigzag manner.

In the above-described zigzag travel, the direction parallel to the path of AB and path A'B' is called the straight forward direction for the autonomous vehicle.

FIGS. 4A–4C are diagrams for describing the rectangle region in which the autonomous vehicle runs in a zigzag manner. FIG. 4A shows the first case where the rectangle region which is the work area is enclosed by a wall such as in a room. FIG. 4B shows the second case where only both sides of the rectangle region have walls as in a corridor. FIG. 4C shows the third case corresponding to an open region.

Referring to FIG. 4A, it is assumed that the user will have the autonomous vehicle conduct an operation such as scavenging starting from one corner of the work area. The autonomous vehicle detects respective distances L1 and L2 to the wall using a sensor. The detected distances are set as the respective dimension of the rectangle region where the zigzag travel is to be carried out.

In FIG. 4B, the user sets a length L1 corresponding to the longitudinal direction where there are no walls. Upon placing the autonomous vehicle at one corner of the work area to begin a predetermined operation, the autonomous vehicle detects a distance L2 to the wall using a sensor. The dimension of the rectangular region in which zigzag travel is to be carried out is set according to the detected distances L1 and L2.

In FIG. 4C, the user sets lengths L1 and L2 corresponding to a straight forward direction and an orthogonal directions thereto to start a predetermined operation. The autonomous vehicle sets the dimension of the rectangle region in which the zigzag travel is to be carried out according to distances L1 and L2.

As described with reference to FIGS. 3A and 3B, the direction of travel at the starting point is set to either a direction parallel to the shorter side or the longer side of the rectangle region to be scavenged.

The scavenger operation time required for covering the rectangle region is calculated for the respective cases shown in FIGS. 3A and 3B. The operation time is the sum of the time required for a straight forward travel and the time required for rotating 90 degrees. The operation time is represented by the following equation.

(Operation time)={(distance of one straight forward travel)×(number of lanes to run)+(distance of lane change)×(number of lanes−1)}/(running speed)+(time consumed for 90° rotation)× (number of U turns)×2.

In the cases of 3A and 3B, it is assumed that the autonomous vehicle zigzags a rectangle region of 10 m×5 m at the operation width of 50 cm. The running speed is 30 cm/second, and the time required to turn 90 degrees is 2 seconds.

In the zigzag travel of FIG. 3A, (number of lanes to run)=20, and (number of U turns)=19. Substituting these into the above equation, (operation time)={5×20+0.5×19}/ 0.3+2×19×2=441 [second].

In the zigzag travel of FIG. 3B, (number of lanes to run)=10 and (number of U turns)=9. Substituting these into the above equation, (operation time)={10×10+0.5×9}/0.3+ 2×9×2=384 [second].

It is appreciated that there is a difference of approximately 60 seconds depending upon the direction of travel of the autonomous vehicle from the starting point of a rectangle work area of 10 m×5 m.

The time of 2 seconds for a 90° rotation is the ideal time where there is no obstacle in the neighborhood. In practice, there is a possibility that the autonomous vehicle will move backward from the wall to rotate 90 degrees and then return to its former position in taking a U turn at the wall. Therefore, a greater time is required in practice.

When the time required for a 90° rotation is 6 seconds, there is a difference of approximately 140 seconds according to the calculation of the above equation depending upon the direction of travel of the autonomous vehicle at the starting point of the operation.

For the sake of simplifying the calculation, the acceleration and deacceleration of the autonomous vehicle at the beginning and end of each straight run is not taken into account. Therefore, the difference will become greater when these issues are taken into consideration.

Thus, it is appreciated that the direction of travel of the autonomous vehicle in commencing a zigzag travel greatly affects the operation time.

An autonomous vehicle that is made to conduct an operation by remote control will be described hereinafter. The user has an autonomous vehicle conduct an operation (this operation includes travel) within a work area using a controller that provides remote control of the autonomous vehicle. Upon completion of the operation, the series of the work operation is recorded in a memory card. By having the autonomous vehicle conduct an operation using a controller and recording the series of operation, the autonomous vehicle can be made to learn a work operation.

The autonomous vehicle can repeat the same operation by reproducing the learned operation. However, the conventional autonomous vehicle cannot run in an area other than the predetermined region stored in the memory.

The following technique can be derived by combining the above-described art.

When an autonomous vehicle detects an interruption in the wall while running along a wall, the depth of the concave of that wall is measured. The travel at the concave region is determined according to the depth of the concave. The travel that can be selected in this case includes a zigzag travel at the concave region, a horizontal travel at the concave region, and a straight forward travel ignoring the concave region. However, no particular consideration is provided of the selection in the direction of advance of the zigzag travel.

SUMMARY OF THE INVENTION

An object of the present invention is to provide an autonomous vehicle that can determine in advance, during a tracer travel along a wall plane, whether a subsequent tracer travel is possible or not even when an interruption in the wall plane is detected, and a method of selecting a route of travel.

Another object of the present invention is to provide an autonomous vehicle that can have the running time reduced in a zigzag travel, and a method of selecting a route of travel.

According to an aspect of the present invention, an autonomous vehicle includes a tracer sensor for sensing a tracer status with respect of an object of interest, a configuration measurement unit for measuring a configuration of an object of interest located ahead when the tracer sensor senses an interruption in the object of interest, and a drive unit for carrying out a predetermined operation on the basis of the configuration measured by the configuration measurement unit.

When the tracer sensor senses an interruption in the object of interest, the configuration measurement unit measures the configuration of the object of interest located ahead. Determination is made of whether the configuration measured by the configuration measurement unit corresponds to a tracer travel permissible configuration or not. When determination is made that tracer travel is permitted, the drive unit continues the run. Therefore, determination can be made in advance whether the subsequent tracer travel is permitted or not even in the case where the autonomous vehicle detects an interruption in the wall plane.

According to another aspect of the present invention, a method of selecting a path of travel for an autonomous vehicle includes the steps of detecting a tracer status with respect to an object of interest, measuring the configuration of the object of interest ahead when an interruption in the object of interest is detected, and selecting a path of advance according to the measured configuration.

The autonomous vehicle measures the configuration of an object of interest located ahead when an interruption in the currently followed object of interest is detected. Determination is made whether the measured configuration is a tracer travel permissible configuration. When determination is made that tracer travel is permitted, the travel is continued. Therefore, determination can be made in advance whether the subsequent tracer travel is permitted or not even when the autonomous vehicle detects an interruption in the wall.

According to another aspect of the present invention, an autonomous vehicle includes a sense unit for sensing a length in a plurality of different directions in a first region, and sensing a second region differing from the first region during travel in the first region, a selector for selecting a direction of advance of a zigzag travel in the second region according to a sensed result by the sense unit, and a drive unit for driving in a zigzag manner in the second region according to the direction of advance selected by the selector.

The selector selects the direction of advance of the zigzag travel in the second region according to a sensed result by the sense unit. When the second region is, for example, a rectangle region, the selector selects as the direction of advance the direction of the longer of the lengths of the rectangle region in the vertical direction and the horizontal direction. Therefore, the time of travel can be reduced by having the autonomous vehicle run in the selected direction of advance for the zigzag travel.

According to a still another aspect of the present invention, an autonomous vehicle includes a detection unit for detecting a length in two different directions of a predetermined region, an advance direction set unit for setting the direction of advance according to the detected length of the two directions by the detection unit, and a drive controller for zigzagging in the direction of advance set by the advance direction set unit.

The advance direction set unit sets the direction of advance according to the length in the two directions in a predetermined region detected by the detection unit. When the predetermined region is, for example a rectangle region, the longer of the length in a vertical direction and a horizontal direction of the rectangle region is set as the direction of advance. Therefore, the autonomous vehicle can have the time of travel reduced by zigzagging in the set direction of advance.

According to a still aspect of the present invention, a method of selecting a path of advance of an autonomous vehicle includes the steps of detecting distances in a vertical direction and a horizontal direction of the autonomous vehicle in a predetermined rectangle region, determining the longer distance of the detected vertical distance and the horizontal distance, and setting the direction of the longer distance as the direction of advance for the autonomous vehicle.

The autonomous vehicle sets the direction of the longer distance of the vertical distance and the horizontal distance of the predetermined rectangle region as the direction of advance. Therefore, the autonomous vehicle can have the running time reduced by zigzagging in the determined direction of advance.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a perspective view of a contact sensor of a scavenger robot according to an embodiment of the present invention.

FIGS. 9A and 9B are top plan views for describing the operation of the contact sensor of FIG. 8.

FIGS. 10A–10C show the manner of detecting an interruption in a wall by a scavenger robot according to an embodiment of the present invention.

DESCRIPTION OF THE PREFERRED EMBODIMENTS

An autonomous vehicle for scavenging (referred to as scavenger robot hereinafter) to which the present invention is applied will be described hereinafter with reference to the drawings.

First Embodiment

Figure 1:
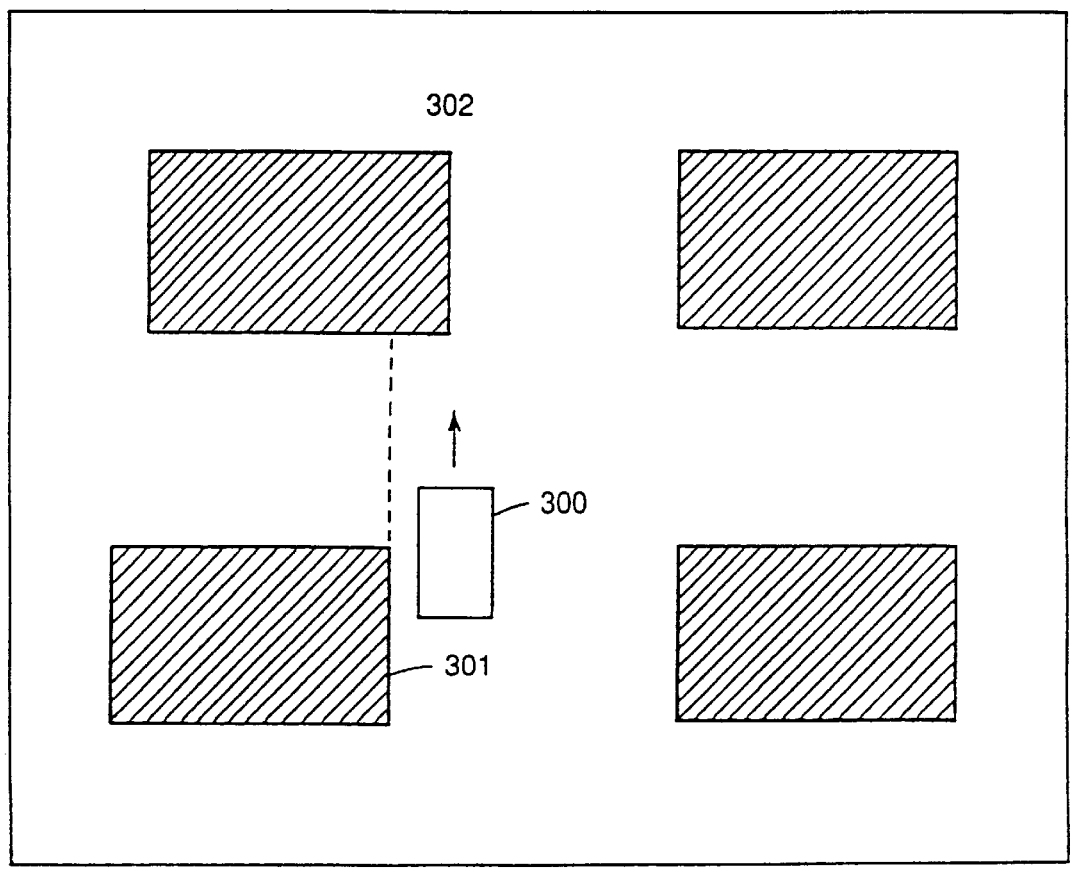
FIG. 1 is a diagram for describing problems of a conventional autonomous vehicle in a contact tracer travel.
Figure 2:
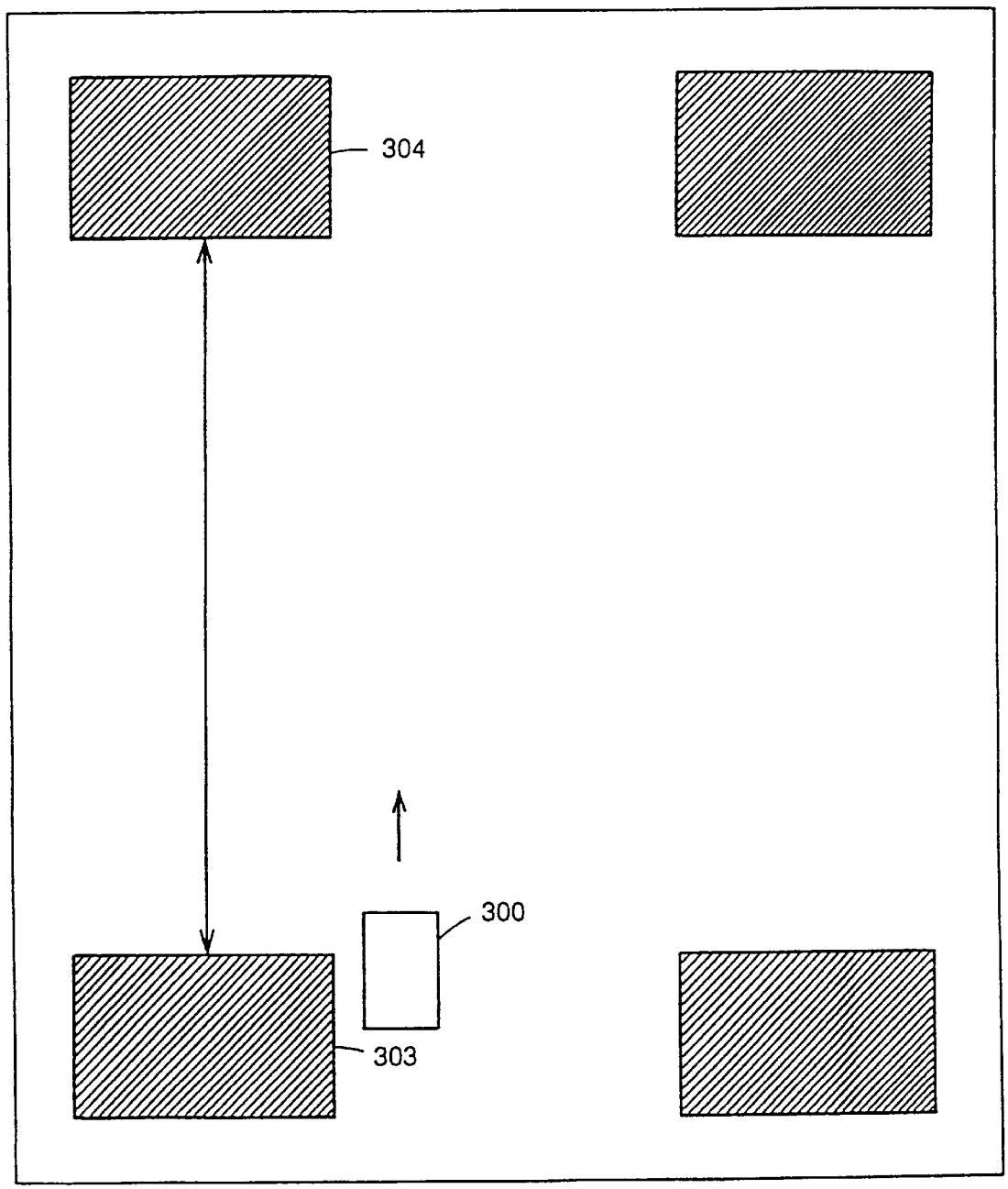
FIG. 2 is a diagram for describing another problem of a conventional autonomous vehicle in a contact tracer travel.
Figure 3A:
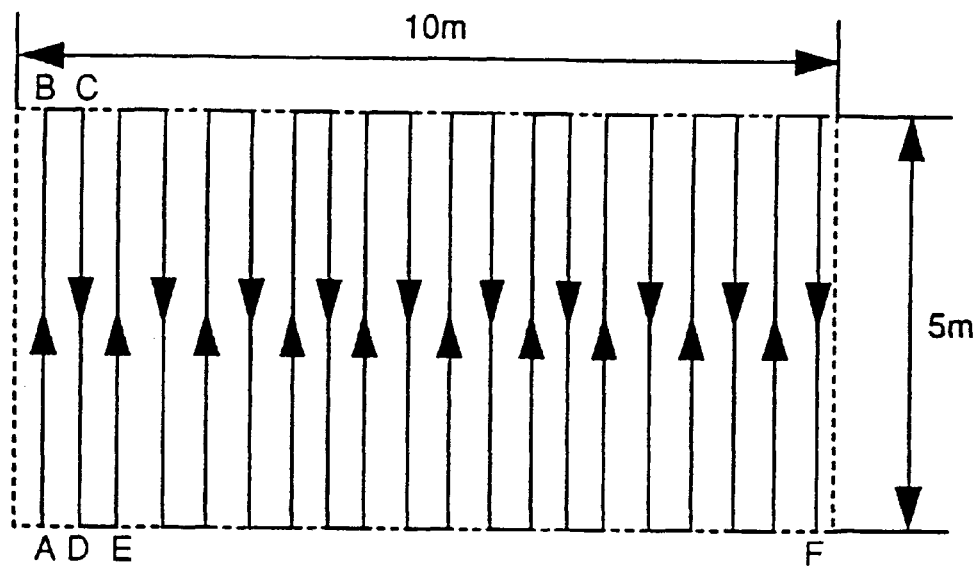
FIGS. 3A and 3B are diagrams for describing the path of an autonomous vehicle that travels in a rectangle region.
Figure 3B:
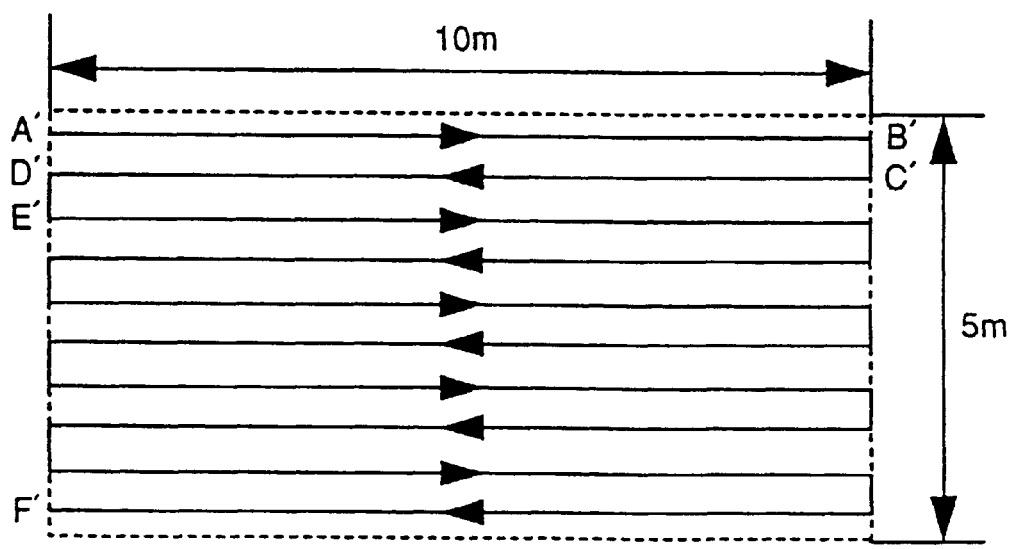
Figure 4C:
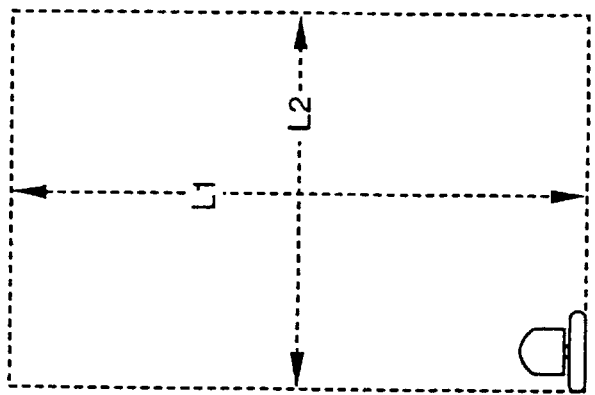
FIGS. 4A–4C are diagrams for describing the setting of a rectangle region for a zigzag travel by an autonomous vehicle.
Figure 4B:
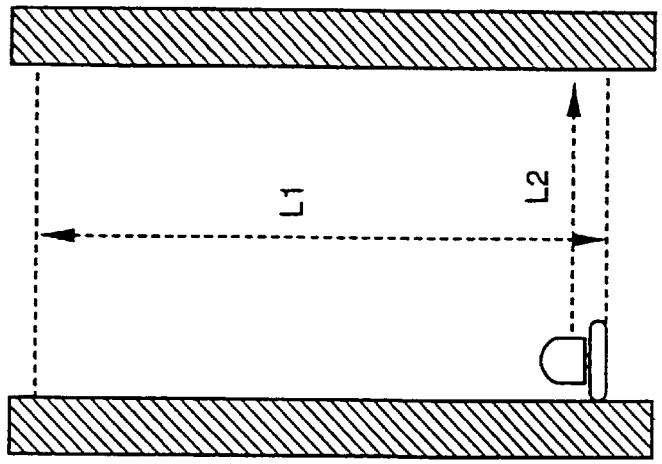
Figure 4A:
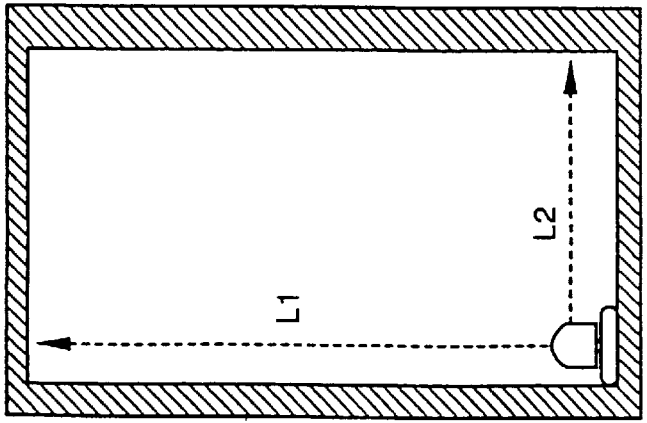
Figure 5:
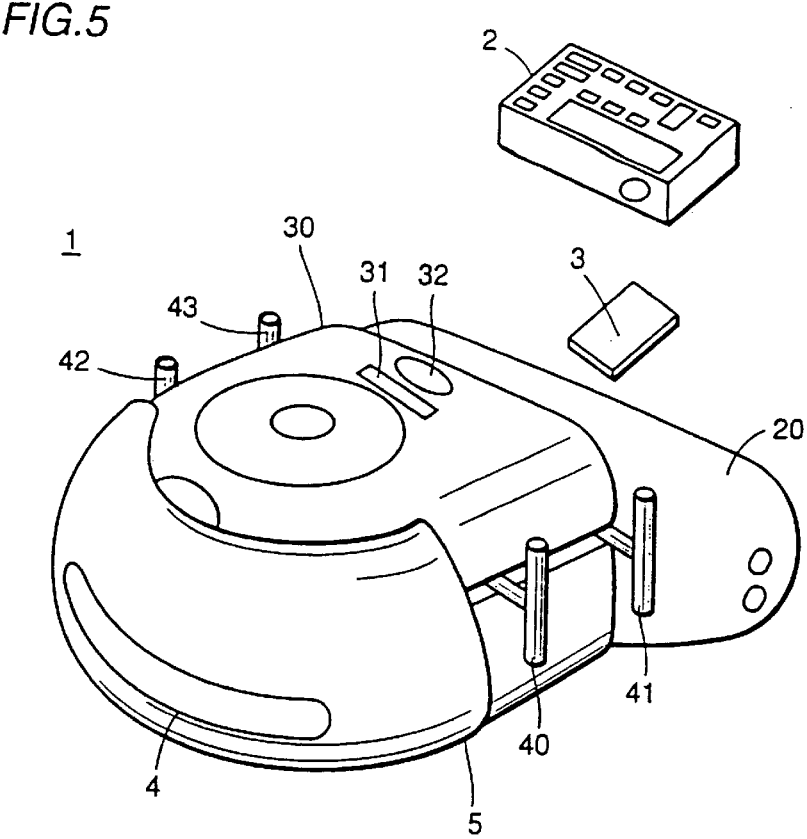
FIG. 5 shows an appearance of a scavenger robot according to a first embodiment of the present invention.
Figure 6:
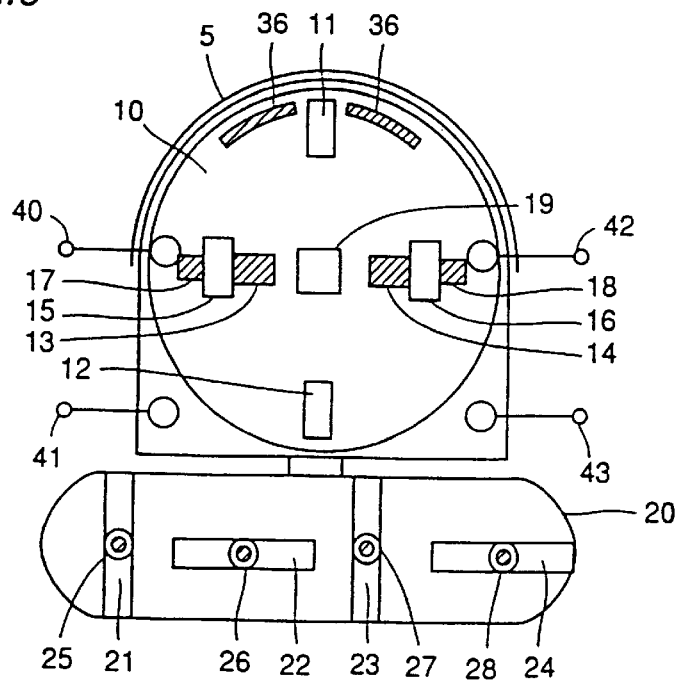
FIG. 6 shows an entire structure of the scavenger robot according to the first embodiment.

Referring to FIGS. 5 and 6, a scavenger robot includes a scavenger robot unit 1, a controller 2, and a memory card 3. Controller 2 is used to remote-control scavenger robot unit 1 or instruct travel and operation thereto. Memory card 3 is used to store instructions for scavenger robot unit 1.

Scavenger robot unit 1 is mainly constituted by a mobile unit 10 with a driving wheel, a scavenger unit 20 for performing scavenging, and a chassis unit 30 supported on mobile unit 10 (refer to FIG. 6).

Mobile unit 10 includes a front caster 11, a rear caster 12, a left drive motor 13, a right drive motor 14, a left wheel 15, a right wheel 16, a left encoder 17, a right encoder 18, and a gyrosensor 19.

Left and right drive motors 13 and 14 drive left and right wheels 15 and 16, respectively, whereby scavenger robot unit 1 can move straight ahead or rotate. Front and rear casters 11 and 12 support the weight of scavenger robot unit 1 together with left and right wheels 15 and 16.

Left and right encoders 17 and 18 calculate the distance of travel and rotation angle of scavenger robot unit 1. Gyrosensor 19 is a rate gyrosensor to measure the rotation angular velocity of mobile unit 10. The measured value is provided to mobile unit CPU 121 at a constant cycle (for example, every 1 millisecond). By using gyrosensor 19, the direction to which scavenger robot unit is to turn and the rotation angular velocity can be detected from the original direction of advance of scavenger robot unit 1. Mobile unit CPU 121 integrates the value of the rotation angular velocity output from gyrosensor 19 over time to calculate the rotation angle of mobile unit 10.

Scavenger unit 20 includes cleaning rotary pads 21, 22, 23, and 24, and rotors 25, 26, 27 and 28.

A detergent or the like is applied as cleaning rotation pads 21, 22, 23, and 24 attached to rotor 25, 26, 27 and 28, respectively, rotate. The detergent is provided in droplets by a pump 71 which will be described afterwards.

Chassis unit 30 includes a display unit 31, an operation start button 32, a bumper sensor 5, a distance measure window 4, a plurality of optical distance measurement sensors 36, left side tracer sensors 40 and 41, and right side tracer sensors 42 and 43.

In mobile unit 10, a plurality of optical distance measurement sensors 36 are provided radially about the axis identical to the center of rotation of mobile unit 10 at both sides of front caster 11. The plurality of optical distance measurement sensors 36 are arranged so that their axes have respective predetermined angles to the straight line connecting front and rear casters 11 and 12 to allow measuring the distance over a wide range ahead of mobile unit 10.

Display unit 31 provides the display of the operation guidance and error messages for the user. The user has the scavenger robot initiate an operation by depressing an operation start button 32. Bumper sensor 5 senses contact with an obstacle that is located at the direction of advance of the scavenger robot. Distance measurement sensor 36 measures the distance up to the obstacle located ahead of scavenger robot unit 1 from distance measurement window 4 provided in bumper sensor 5. Left side tracer sensors 40 and 41 and right side tracer sensors 42 and 43 measure the distance from the wall to allow travel following a wall or the like.

Figure 7C:
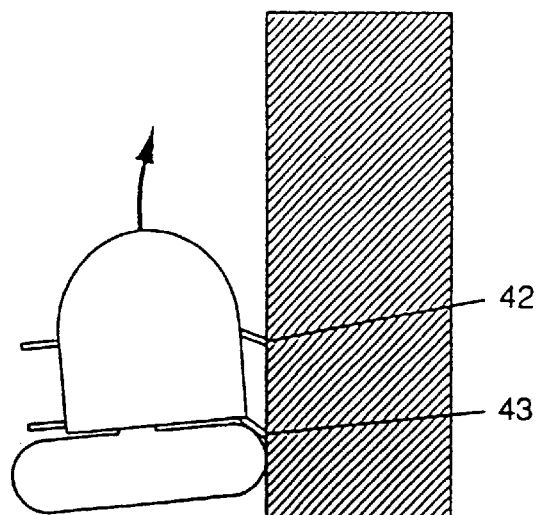
FIGS. 7A–7C show the manner of contact tracer travel of a scavenger robot according to an embodiment of the present invention.
Figure 7B:
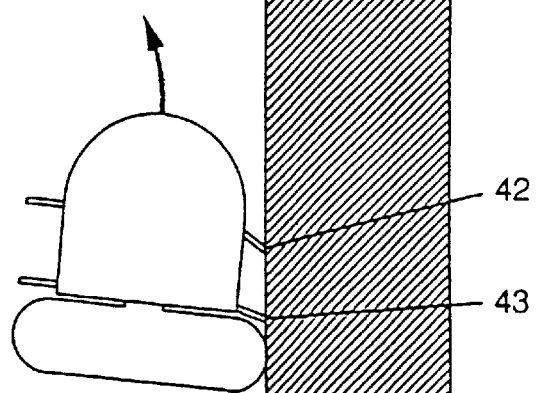
Figure 7A:
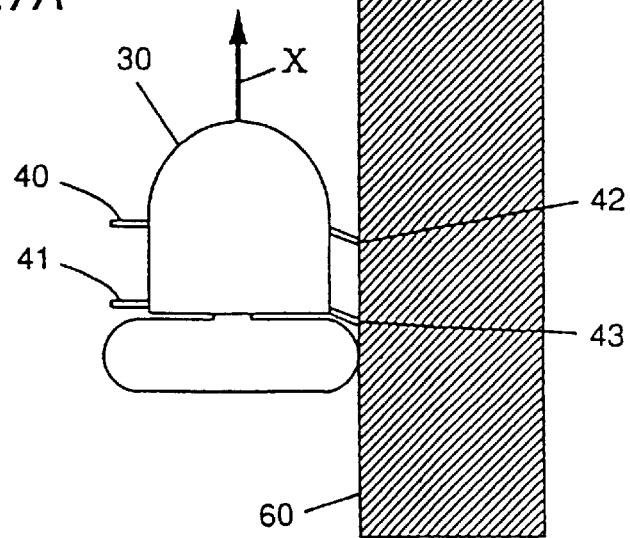

As shown in FIGS. 7A–7C, the scavenger robot runs in a contact-tracer manner by having right tracer sensors 42 and 43 of the scavenger unit 20 measure the distance to a sidewall 60 while forming contact with sidewall 60.

The tracer sensor will be described in detail hereinafter. Tracer sensor 40 includes a tracer sensor bed 61, a bed claw 62, a potentiometer 63, a shaft 64, a shaft positioning claw 65, a torsion coil spring 66, and a contact 67.

Tracer sensor bed 61 is fixed above potentiometer 63 for attaching tracer sensor 40 to the scavenger robot. The rotary shaft of potentiometer 63 is connected to shaft 64. Contact 67 is provided at the leading edge of shaft 64 to form contact with, for example, a wall. Tortion coil spring 66 is attached rotatably to the rotary shaft of potentiometer 63 to fix the position of shaft 64 by sandwiching bed claw 62 and shaft positioning claw 65.

Shaft 64 is rotatable clockwise or counterclockwise by a predetermined angle about the rotary shaft of potentiometer 63. Shaft 64 rotates within a predetermined plane as a result of shaft 64 and contact 67 forming contact with, for example, a wall. When contact 67 of shaft 64 comes off the wall, shaft 64 is returned to its neutral position by means of the bias force from tortion coil spring 66.

The operation of the tracer sensor of the above structure will be described hereinafter. FIG. 9A shows the case where contact 67 is not in contact with a wall 60. FIG. 9B shows the case where shaft 64 is shifted within a predetermined plane as a result of contact of contact 67 with wall 60.

Referring to 9A, shaft 64 is fixed at the direction of bed claw 62 by having torsion coil spring sandwiching bed claw 62 and shaft positioning claw 65.

Upon contact of contact 67 with wall 60, shaft 64 is pushed by wall 60 to rotate about the rotary shaft of potentiometer 63, as shown in FIG. 9B. The distance D from the center of the rotary shaft of potentiometer 63 to wall 60 can be represented by the following equation (1) of:

$$D = d + L \cos A \qquad (1)$$

where A is the angle of rotation, L the length of the shaft, and d the radius of contact 67.

According to equation (1), the distance between tracer sensor 40 and wall 60 can be measured.

Control of the contact tracer travel using the above contact sensor will be described hereinafter. FIGS. 7A–7C show the manner of contact tracer travel by means of tracer sensors 42 and 43 provided at the right side of the scavenger robot along the right side wall 60 with respect to the advance direction X of the scavenger robot. The travel of the scavenger robot is controlled according to the distance from wall 60 to the front right tracer sensor 42 and the rear right tracer sensor 43.

FIG. 7A shows the case where the scavenger robot travels in an advance direction X parallel to the right side wall 60. In this case, the distance measured by front right tracer sensor 42 is equal to the distance measured by rear right tracer sensor 43. Therefore, the scavenger robot continues its advance straight forward. FIG. 7B shows the case where the scavenger robot is moving closer to wall 60. FIG. 7C shows the case where the scavenger robot is moving farther away from wall 60. In FIG. 7B, the front right tracer sensor 42 exhibits a rotation greater than rear right tracer sensor 43. In response, the scavenger robot detects its approach to wall 60. Control is provided so as to run in a curving manner leftwards. In FIG. 7C, the rear right sensor 43 exhibits a rotation greater than front right sensor 42. In response, the scavenger robot detects its departure from wall 60. Control is provided so as to run in a curving-manner rightwards. Thus, the scavenger robot can run without colliding with the wall.

The method of detecting an interruption in a wall by the scavenger robot will be described hereinafter. When the scavenger robot encounters an interruption in the wall while running in a contact-tracer manner along a wall, the output of the tracer sensor oscillates greatly. As a result, an interruption in the wall is detected. FIGS. 10A–10C show the detection of an interruption in the wall. FIG. 10A shows the movement of tracer sensor 40 or 41 at the passage of an interruption in the wall. FIG. 10B shows the output of the sensor angle A obtained from the output value of potentiometer 63 at the passage of the interruption at the wall. FIG. 10C shows the output of distance value D between wall 60 and potentiometer 63 obtained from sensor angle A at the passage of the interruption at the wall.

Referring to FIGS. 10A–10C, (1) (3) correspond to the state where tracer sensor 40 is in contact with wall 60. At the point of (4), tracer sensor 40 comes off wall 60. When tracer sensor 40 is detached from wall 60, shaft 64 is returned to the center direction by torsion coil spring 66. Here, tracer sensor 40 will provide an oscillating output for a predetermined time until shaft 64 is stabilized. Therefore, sensor angle A obtained from the output of potentiometer 63 and the distance value D between wall 60 and potentiometer 63 show a waveform as in (4)~(7). The great oscillation in the output of sensor angle A or distance value D indicates change in speed. Therefore, detection can be made of an interruption in the wall.

According to the scavenger robot of the present embodiment, the distance up to an object of interest that cannot be detected by tracer sensors 40–43 can be detected by optical distance measurement sensor 36 provided in mobile unit 10.

Figure 11:
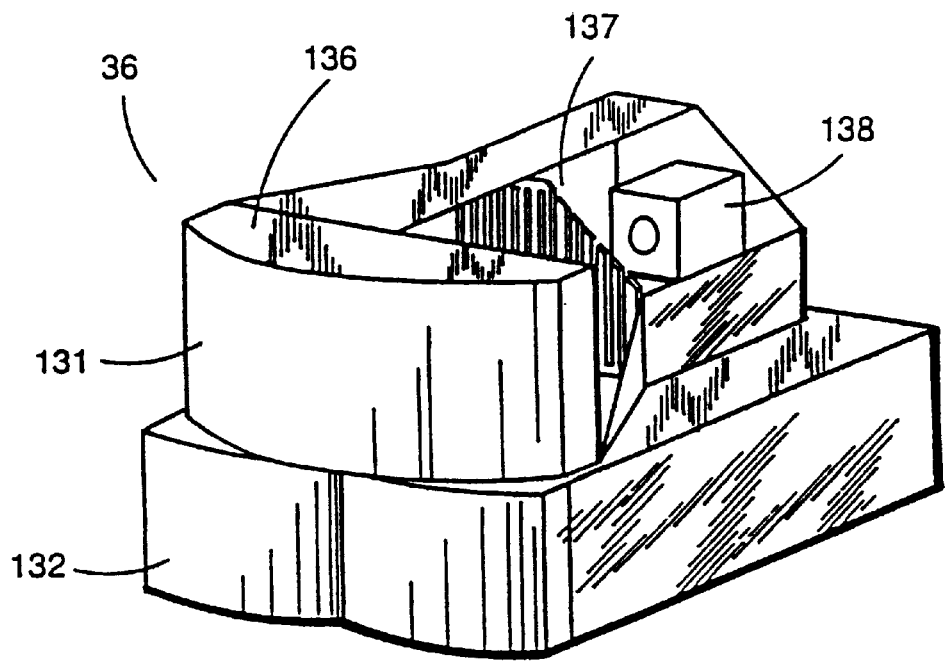
FIG. 11 is a perspective view showing a structure of an optical distance measurement sensor of a scavenger robot according to an embodiment of the present invention.

This optical distance measurement sensor will be described hereinafter. Referring to FIG. 11, an optical distance measurement sensor 36 includes a light receiving unit 132 and an auxiliary optical unit 131. Auxiliary optical unit 131 provided to improve the contrast image of an object of interest such as a wall. Auxiliary optical unit 131 provided above light receiving unit 132 includes a lens 136, a slit row 137 of a random interval, and a LED (light emitting diode) 138. The light from LED 138 is converted into light of a slit pattern by slit row 137 to be directed to an object of interest via lens 136. Accordingly, the image contrast of the object of interest is improved to allow measurement up to the object of interest by light receiving unit 132 even in the case where the object of interest per se has no contrast such as in the case of a white wall.

Figure 12A:
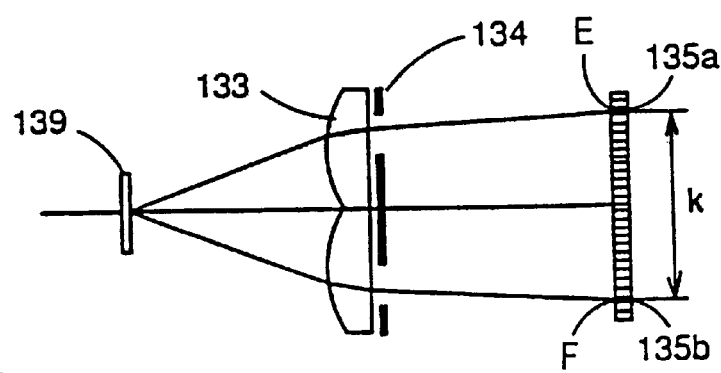
FIGS. 12A and 12B are top plan views showing a structure of a light receiving unit of the optical distance measurement sensor of FIG. 11.
Figure 12B:
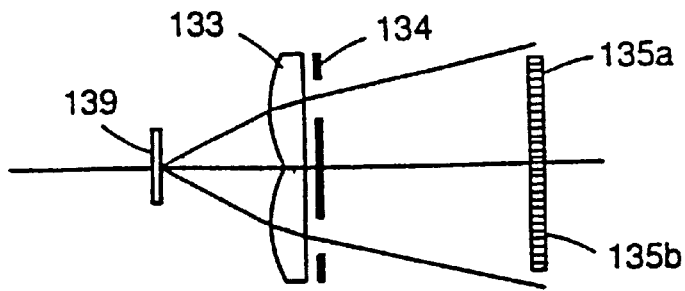

Referring to FIGS. 12A and 12B, light receiving unit 132 includes a plurality of CCD line sensors having a separator lens 133, a diaphragm mask 134, and CCD line sensors 135a and 135b. An image of an object of interest 132 entering light receiving unit 132 is formed divided by the two left and right CCD line sensors 135a and 135b by means of separator lens 133 and diaphragm mask 134 provided at the back side of separator lens 133. As shown in FIGS. 12A and 12B, contrast pattern images E and F are generated on each of left and right CCD line sensors 135a and 135b according to the distance up to the object of interest 139 to be measured. By calculating the correlation between E and F, the distance k between the contrast pattern images of E and F can be obtained. From the value k, the distance up to an object of interest 139 can be measured.

Figure 13:
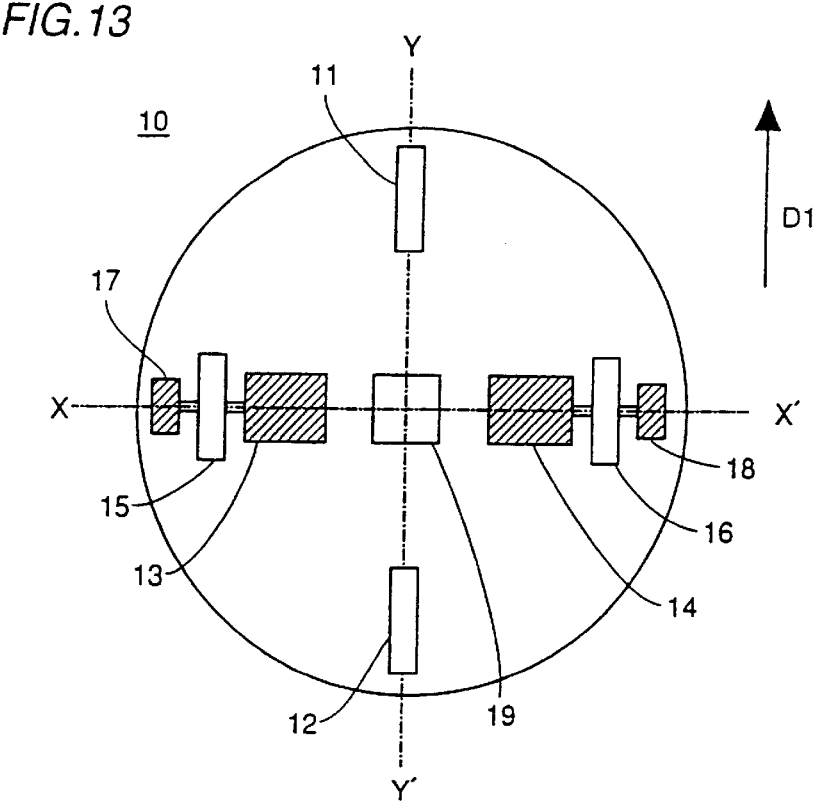
FIG. 13 is a diagram for describing a straight forward travel of a scavenger robot 1.

Referring to FIG. 13, left and right wheels 15 and 16 of mobile unit 10 are provided on a center line X—X'. Front and rear casters 11 and 12 are provided on a center line Y—Y' perpendicular to center line X—X'. Although not shown, a suspension mechanism is provided to at least one of front and rear casters 11 and 12 to aid the travel of scavenger robot unit 1.

In running straight ahead, left and right motors 13 and 14 rotate in the same direction. In response, scavenger robot unit 1 can move in the direction of arrow, D1 in FIG. 13.

Figure 14:
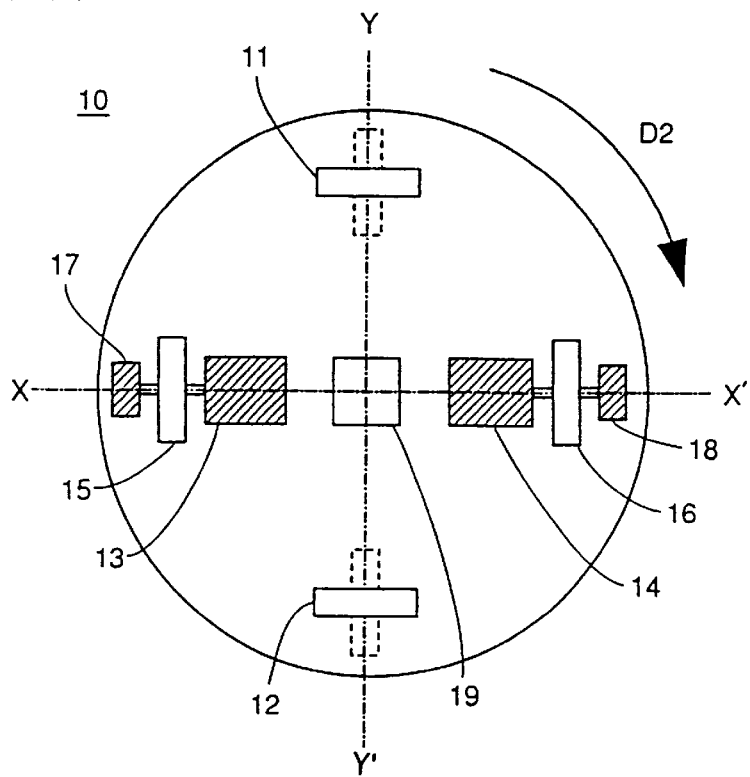
FIG. 14 is a diagram for describing a rotation travel of scavenger robot 1.

At the time of turning as shown in FIG. 14, left and right drive motors 13 and 14 rotate in a direction opposite to each other. As a result, scavenger robot unit 1 can rotate in the direction of arrow D2 in FIG. 14. At the time of rotation-running, front and rear casters 11 and 12 have their orientation altered to be parallel to center line X—X' so as to conform to the rotation. Furthermore, the scavenger robot can travel in a curving manner by controlling the drive ratio of left drive motor 13 to right drive motor 14.

Figure 15:
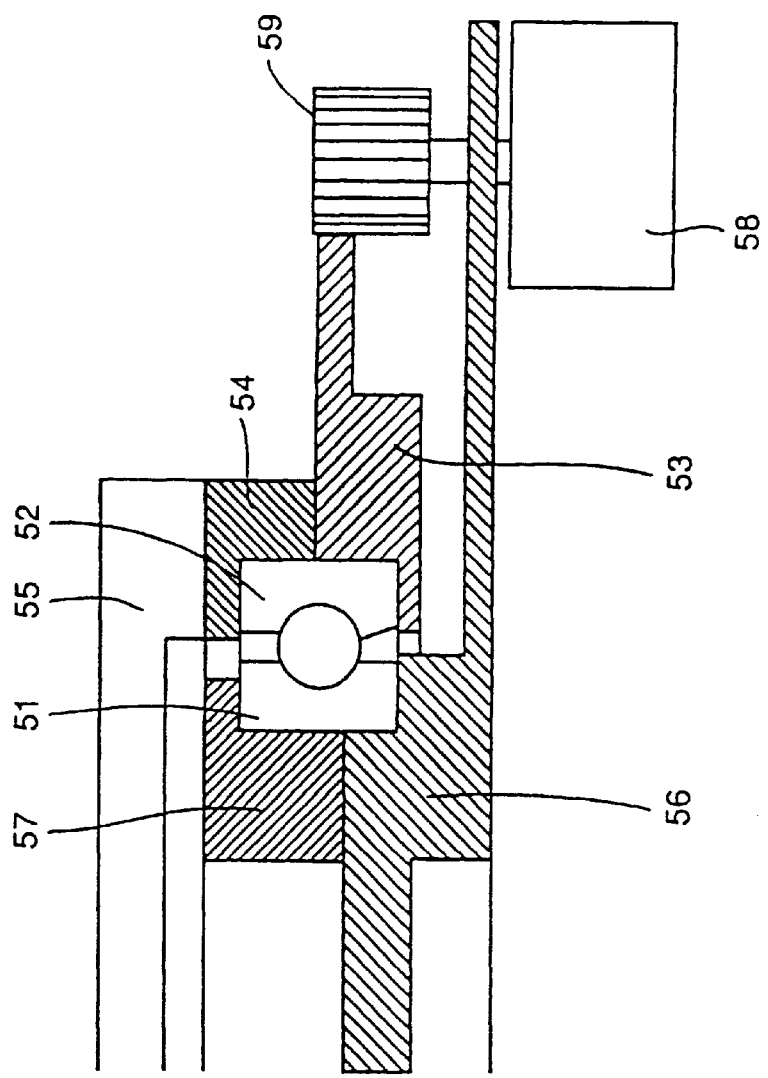
FIG. 15 shows a structure of a rotation mechanism 50 that rotates a chassis unit 30 from mobile unit 10.

Referring to FIG. 15, rotation mechanism unit 50 includes a bearing formed of a bearing inner ring 51 and a bearing outer ring 52, a chassis unit rotation driving gear 53, a bearing outer ring retainer 54, a chassis unit frame 55, a mobile unit frame 56, a bearing inner ring retainer 57, a chassis unit rotary motor 58, a gear 59, and the like.

Mobile unit frame 56 is fixed to bearing inner ring 51 by bearing inner ring retainer 57. Bearing outer ring 52 has chassis unit rotation driving gear 53 fixed thereto by bearing outer ring retainer 54. Bearing outer ring retainer 54 is fixed to chassis unit frame 55. Chassis unit rotary motor 58 is attached to mobile unit frame 56. Chassis unit rotary motor 58 drives chassis unit rotation driving gear 53 via gear 59.

A potentiometer not shown is attached to chassis unit rotation driving gear 53 via gear 59. An accurate angle of rotation of chassis unit 30 with respect to mobile unit 10 can be detected.

The above-described structure of rotation mechanism unit 50 allows chassis unit 30 to be rotated in a range of −90 degrees~+90 degrees with respect to center line Z—Z' independent of mobile unit 10.

Figure 16:
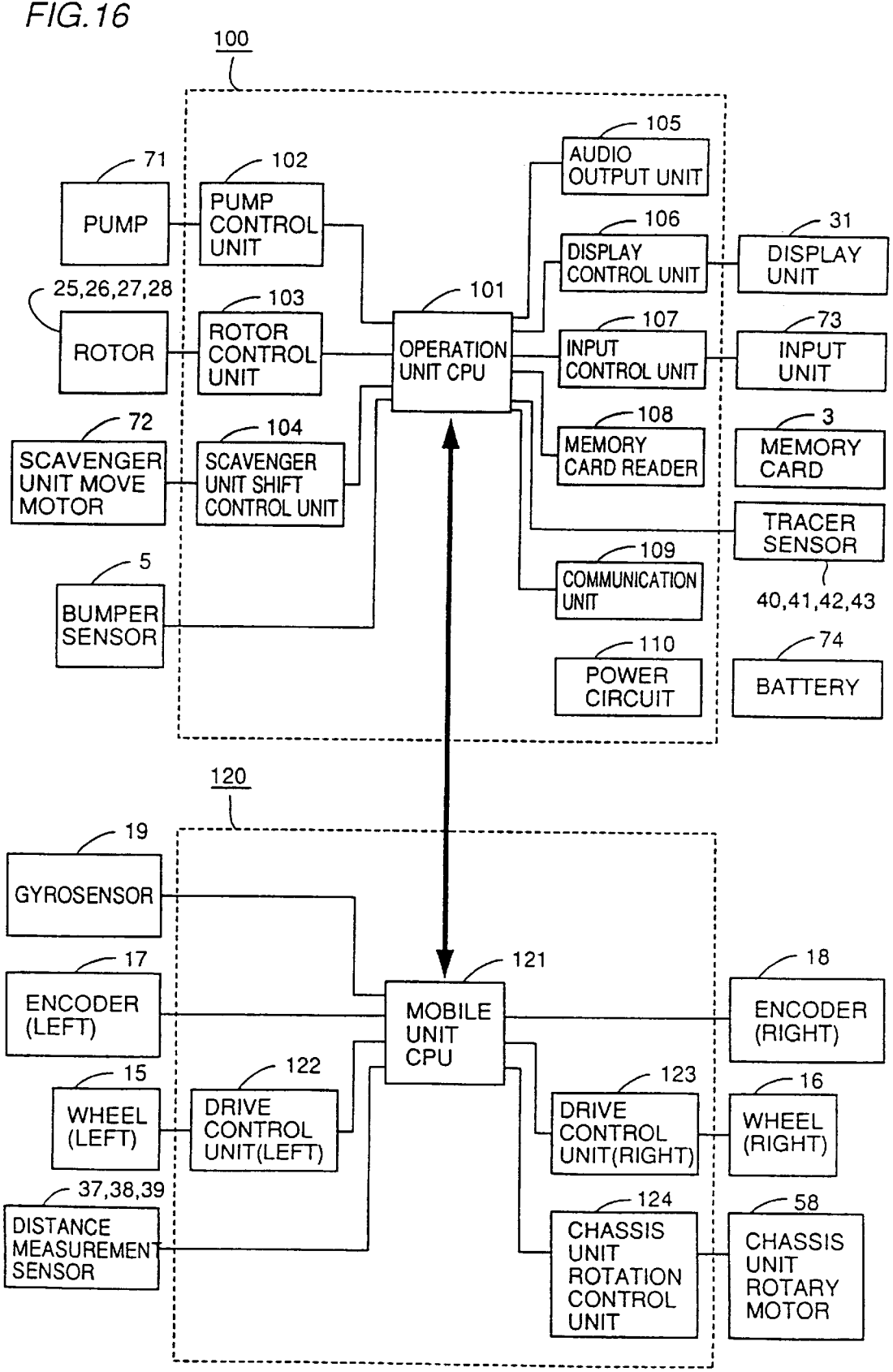
FIG. 16 is a block diagram showing a circuit configuration of scavenger robot 1.

Referring to FIG. 16, the control unit of scavenger robot unit 1 is formed of a travel control unit 120 for providing control of the travel of scavenger robot unit 1, and an operation control unit 100 for providing control of the scavenger operation.

Travel control unit 120 includes a travel unit CPU 121 providing the overall control of mobile unit 10, drive control units 122 and 123 providing control of left and right wheels 15 and 16, respectively, and a chassis rotation control unit 124 for providing control of chassis unit rotary motor 58. Each control unit is connected to mobile unit CPU 121.

Furthermore, mobile unit CPU 121 has left and right encoders 17 and 18, gyrosensor 19, front distance measurement sensor 37, right distance measurement sensor 38, and right distance measurement sensor 39 connected thereto. Each measured value is transmitted to travel unit CPU 121.

Operation control unit 100 includes an operation unit CPU 101 for providing control of the process of the scavenger operation, a pump control unit 102 for providing control of the pump that applies the required detergent for the scavenger operation in droplets, a rotor control unit 103 for providing control of rotors 25, 26, 27 and 28, a scavenger unit movement control unit 104 for providing control of a scavenger unit movement motor 72 that moves scavenger unit 30 in a horizontal parallel manner, and an audio output unit 105 for providing an audio message.

Operation control unit 100 further includes a display control unit 106 for controlling the display on display unit 32, an input control unit 107 for providing control of the input from input unit 73 such as the start of the operation of scavenger robot unit 1, turning on/off the power, and the like, a memory card reader 108 for reading out information stored in memory card 3 such as the content of the scavenger operation, and a communication unit 109 for providing communication with controller 2. Operation control unit 100 includes a power circuit 110 connected to a battery 74. Each control unit, memory card reader 108, communication unit 109 and power circuit 110 are connected to operation unit CPU 101.

Bumper sensor 5 is connected to operation unit CPU 101. The measured value is transmitted to operation unit CPU 101.

Operation unit CPU 101 is connected to mobile unit CPU 121 to provide required information therebetween.

Figure 17:
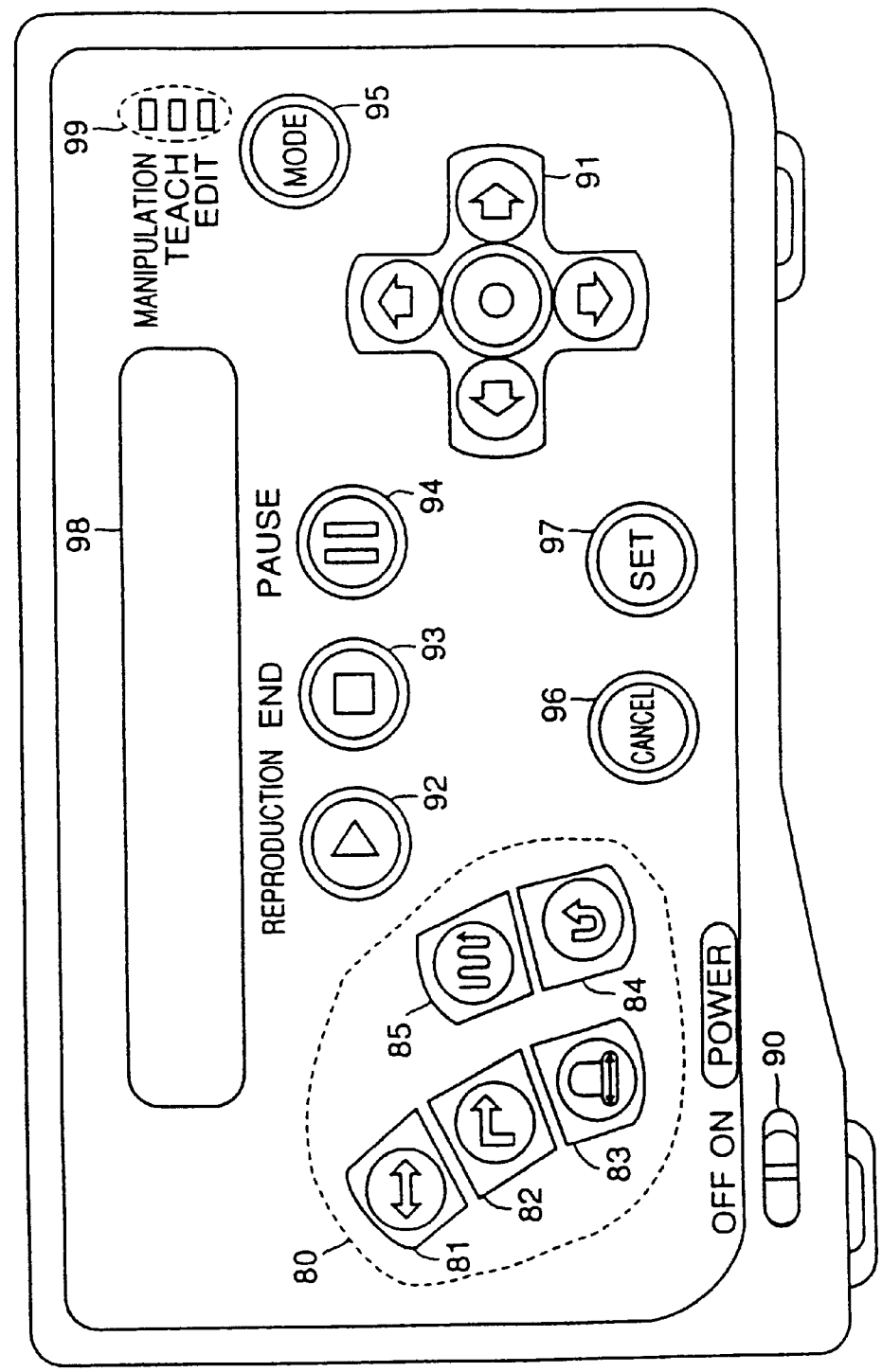
FIG. 17 is a plan view for describing a structure of a controller 2.

Referring to FIG. 17, the input portion of controller 2 includes an operation shift button group 80, a power switch 90, a cursor button 91 for designating up and down directions and left right directions, a reproduction button 92 for designating repeat of an operation stored in memory card 3, an end button 93 for designating termination of an operation, a pause button 94 for stopping the operation temporarily, a mode switch button 95 for switching the operation mode, a cancel button 96 to cancel a setting, and a set button 97 for setting input data.

Operation shift button group 80 includes a mobile unit rotation button 81 for rotating only the direction of mobile unit 10 to left or right without changing the direction of chassis unit 30, a chassis unit rotation button 82 for rotating chassis unit 30 and mobile unit 10 simultaneously, a scavenger operation unit slide button 83 for moving scavenger unit 20 in parallel horizontally with respect to chassis unit 30, a U turn button 84 for designating a U turn operation, and a zigzag button 85 for designating zigzag travel.

Controller 2 includes a display unit 98 formed of a liquid crystal display, and a mode display unit 99 for providing display of an operation mode. Various information required for the user is provided on display unit 98 such as input guidance, the command transmitted to scavenger robot unit 1, and an error message as a result of scavenger robot unit 1 executing a command. The user can input data through various buttons of the input portion while referring to display unit 98.

The operation mode includes a manipulation mode for remote-controlling scavenger robot unit 1, a learning mode for the user to teach an operation to scavenger robot unit 1, and an edit mode for editing the contents of the operation taught by the learning mode. The operation mode selected by switching mode switch button 95 is provided on mode display unit 99.

Figure 18:
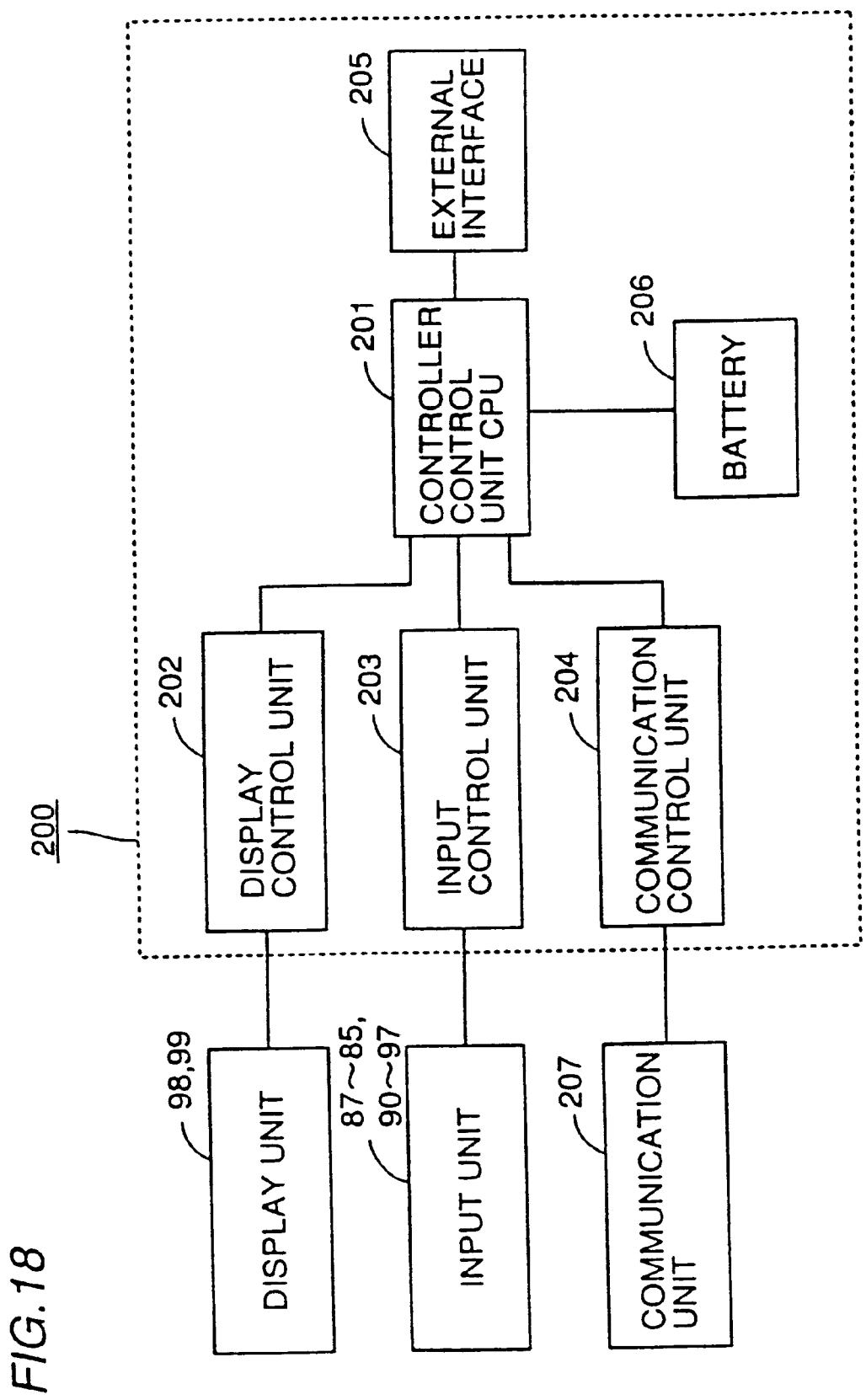
FIG. 18 is a block diagram showing circuitry of controller 2.

Referring to FIG. 18, controller control unit 200 includes a controller control unit CPU 201 for providing control of controller 2, a display control unit 202 for controlling the display of display unit 98, an input control unit 203 for providing control of the input from the input portion, a communication control unit 204 for controlling communication unit 207 that communicates with communication unit 109 of scavenger robot unit 1, an external interface 205, and a battery 206. Controller 2 can be connected to an external device such as a personal computer or a printer via external interface 205.

Figure 19:
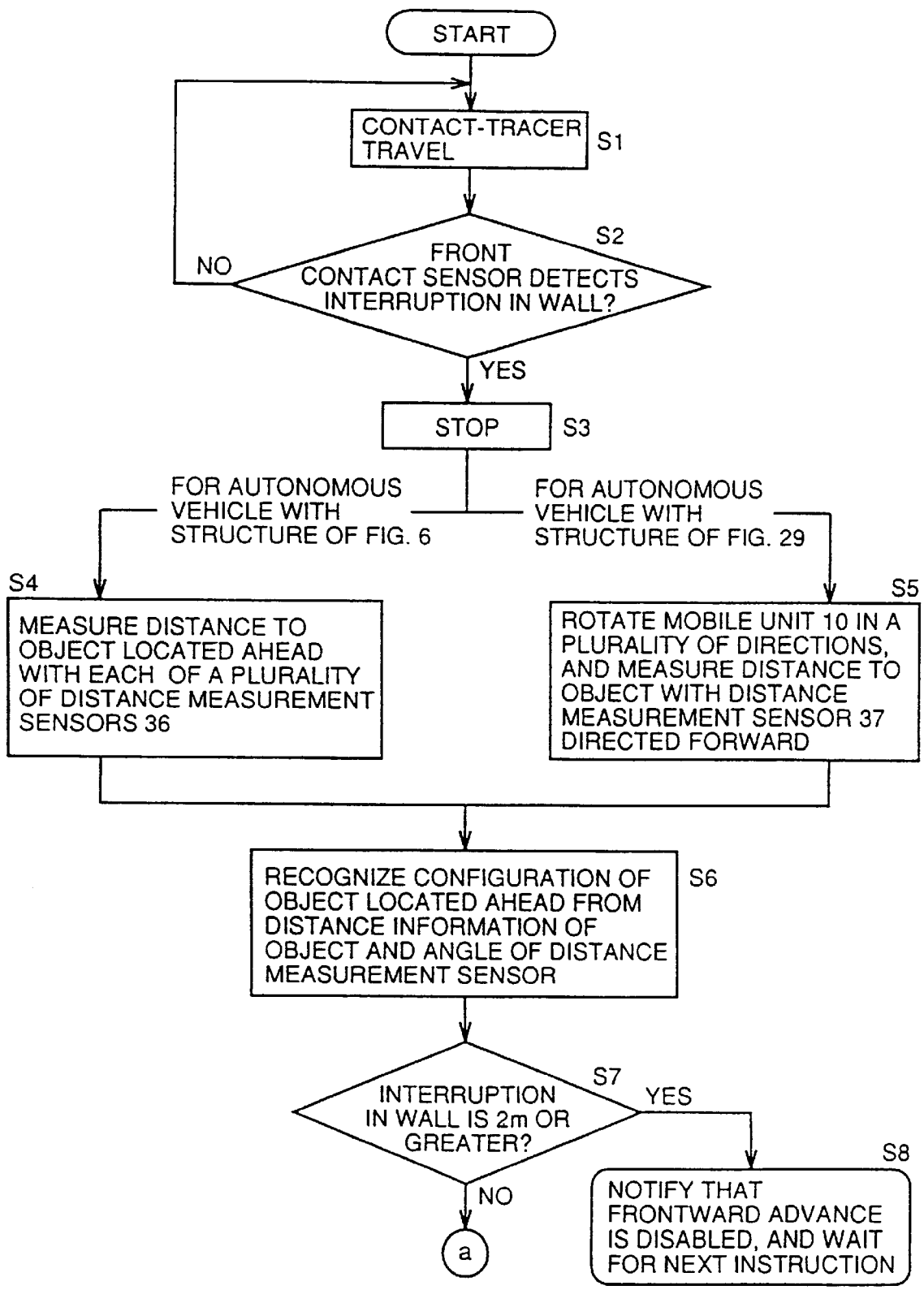
FIG. 19 is a first flow chart for describing an operation of the scavenger robot according to the first embodiment.
Figure 20:
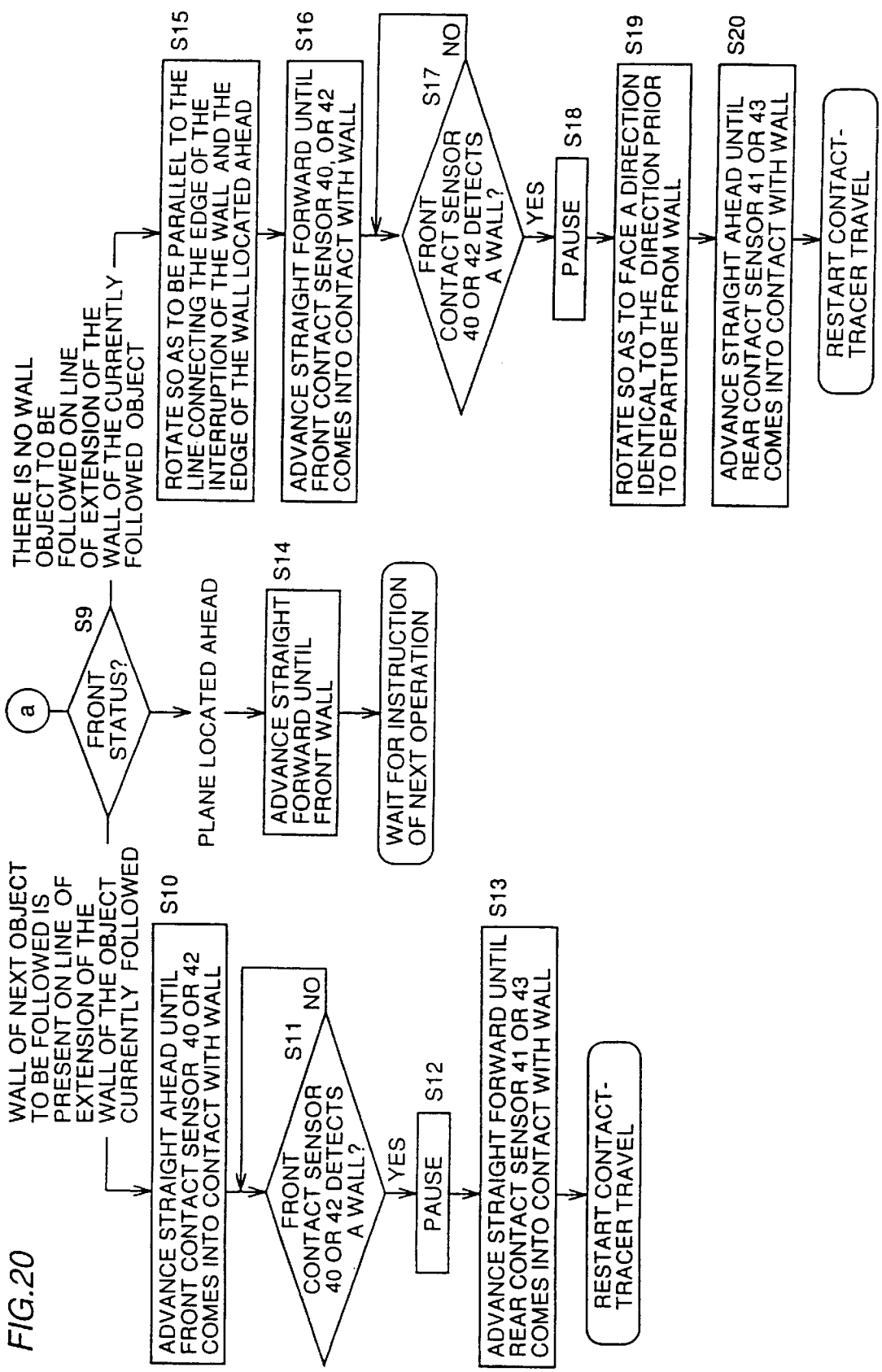
FIG. 20 is a second flow chart for describing an operation of the scavenger robot of the first embodiment.

The operation of the scavenger robot according to the first embodiment of the present invention after detection of an interruption in the wall will be described hereinafter with reference to the flow charts of FIGS. 19 and 20. When the scavenger robot runs in a contact-tracer manner following wall 60 (S1), determination is made whether tracer sensor 40 or 42 attached at either side of the scavenger robot has detected an interruption in the wall. When an interruption in the wall is not detected (S2, NO), the contact-tracer run is continued along wall 60. When tracer sensor 40 or 42 detects an interruption in the wall (S2, YES), the scavenger robot stops at that position (S3).

Figure 21:
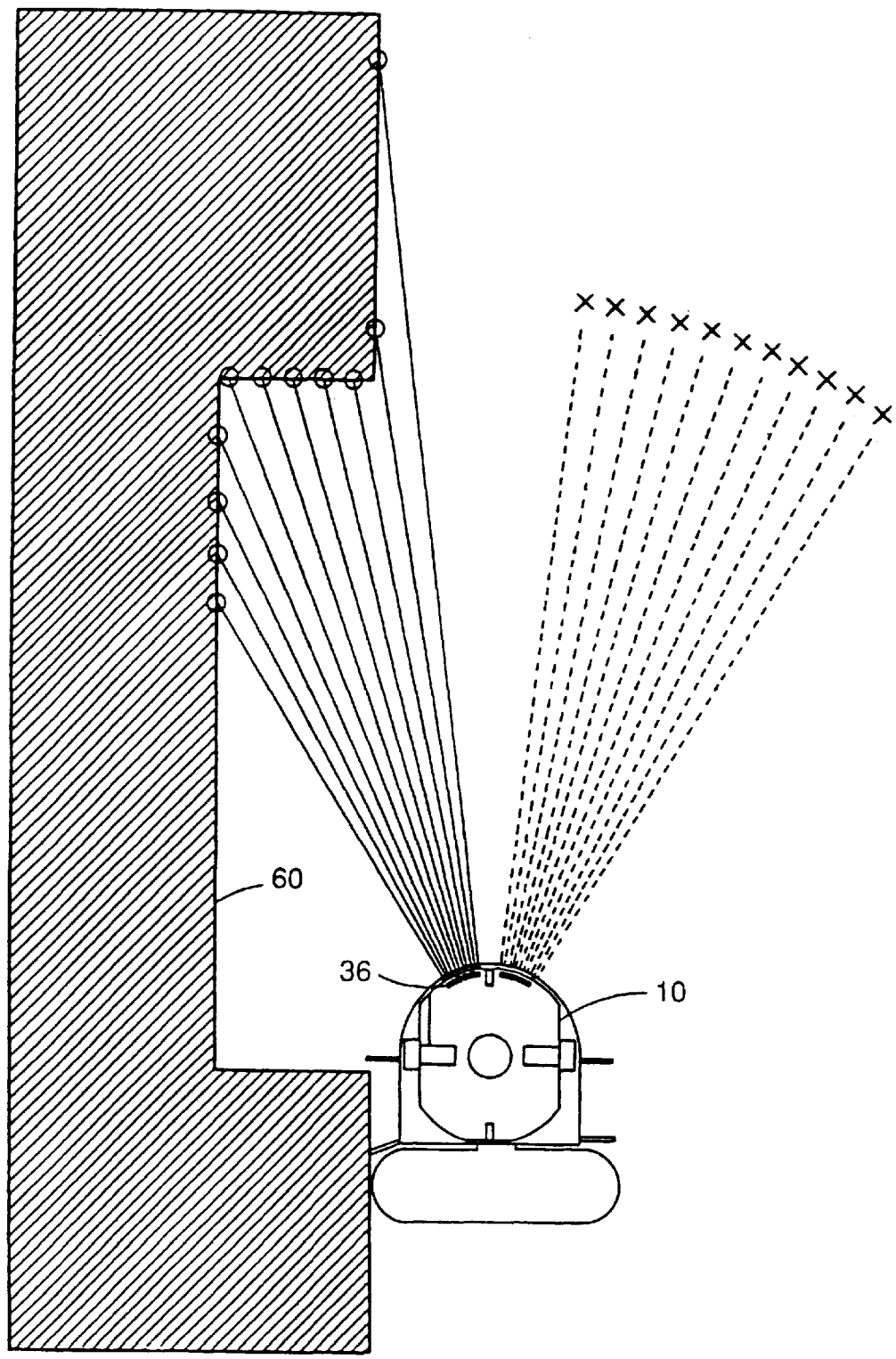
FIG. 21 is a diagram for describing the method of measuring a concave in a wall by the scavenger robot of the first embodiment.

Then, the plurality of optical distance measurement sensors 36 arranged radially as shown in FIG. 21 searches for an object of interest in the direction of advance of the scavenger robot to measure the distance to the object of interest (S4). Since there is no object of interest at the right side of the direction of advance of the scavenger robot as in the case of FIG. 21, the optical distance measurement sensors out of the plurality of distance measurement sensors 36 arranged at the right side of front caster 11 will not be able to measure the distance.

In contrast, the optical distance measurement sensors out of the plurality of optical distance measurement sensors 36 arranged at the left side of front caster 11 can measure a distance since there is a wall which is the object of interest at the left side of the direction of advance of the scavenger robot. The scavenger robot enters the measured data sequentially from the distance measurement sensor located closest to the wall. The distance is measured by each sensor 36 since the distance measurement sensors are provided in a fixed manner.

Figure 22:
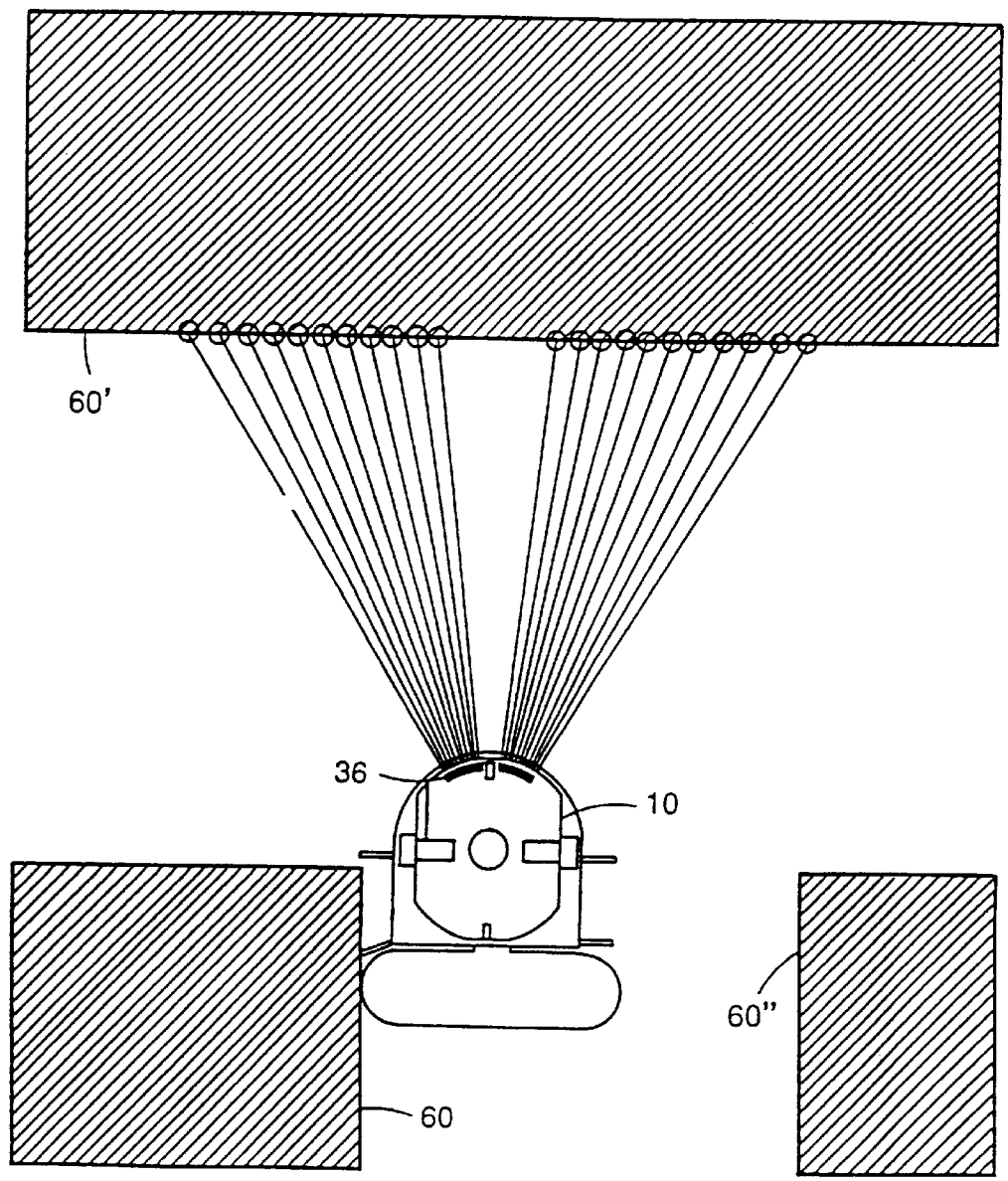
FIG. 22 represents a method of recognizing the configuration of an object of interest located ahead.

FIG. 22 shows the case where there is an object of interest different from that of FIG. 21 ahead of the scavenger robot. In FIG. 22, all the plurality of optical distance measurement sensors 36 can provide a measured distance.

The configuration of the object of interest located ahead is recognized (S6) from the information obtained at the above-described step S4 or a step S5 that will be described afterwards, and from the angle of a relevant distance measurement sensor. The configuration of the object of interest located ahead is recognized according to the distance information with respect to the object measured by the plurality of optical distance measurement sensors 36, and the attached angle of each optical distance measurement sensor, as shown in FIG. 21.

The measured distance data is converted into data of the distance (r) from the center of the scavenger robot up to the object of interest and an angle ($\theta$). The data can be easily converted since the position relationship between the distance measurement sensor and the center of the scavenger robot is known in advance. The converted data is further converted into x-y coordinates with the center of the scavenger robot as the origin. The value is represented in the unit of mm. Angle $\theta$ takes a positive value clockwise with the direction of advance of the scavenger robot as 0. Assuming that the direction of advance of the scavenger robot is the positive direction of the y coordinate, and the right direction with respect to the direction of advance is the positive direction of the x coordinate, $$x = r \cdot \sin\theta, \ y = r \cdot \cos\theta.$$

Figure 23:
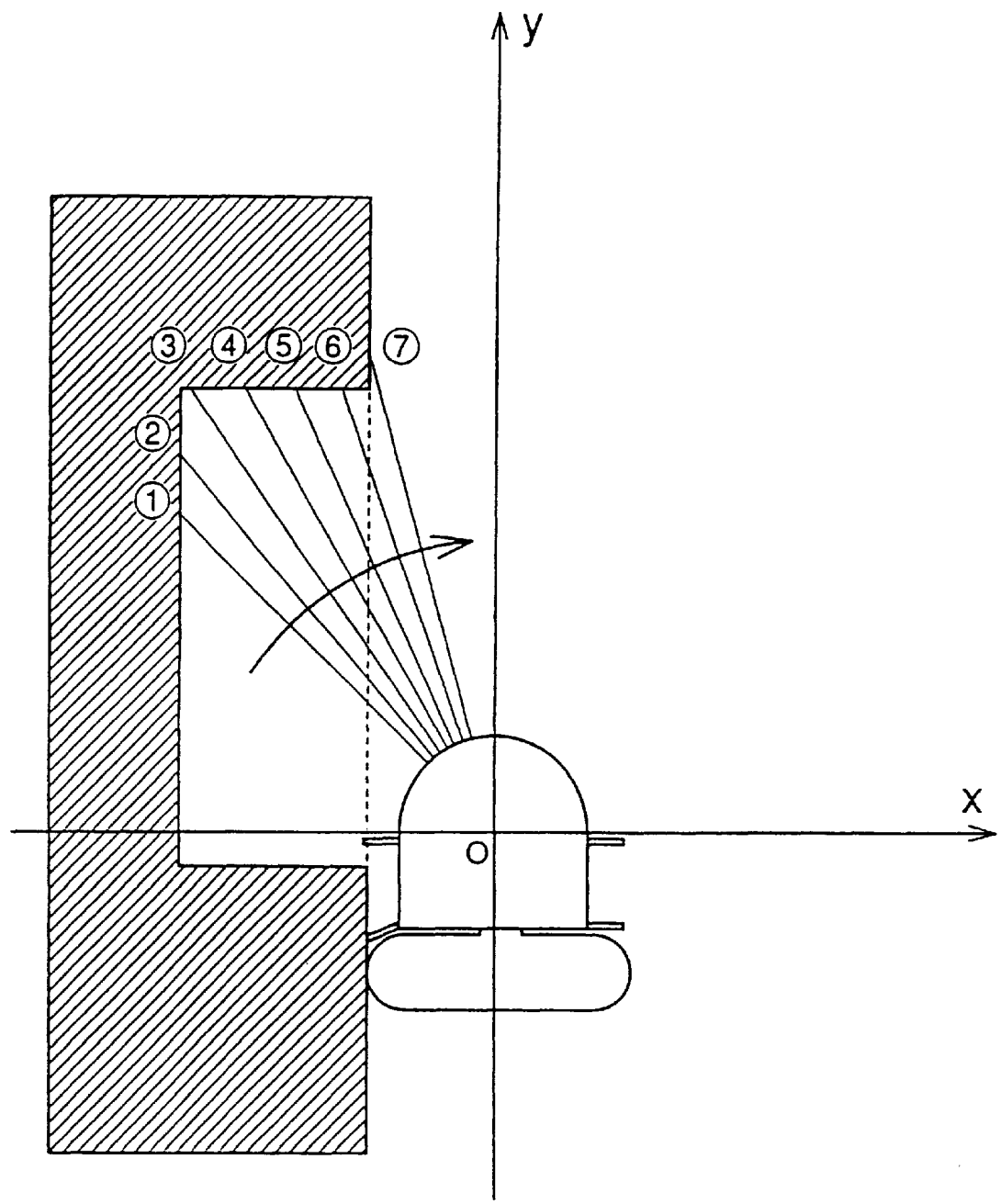
FIG. 23 represents the method of recognizing the configuration of an object of interest located leftwards.

Referring to FIG. 23, the direction of measurement is determined by the fixed position of the distance measurement sensor. Therefore, the first direction of measurement and the last direction of measurement, and also the amount of change in angle therebetween are fixed.

Figure 24:
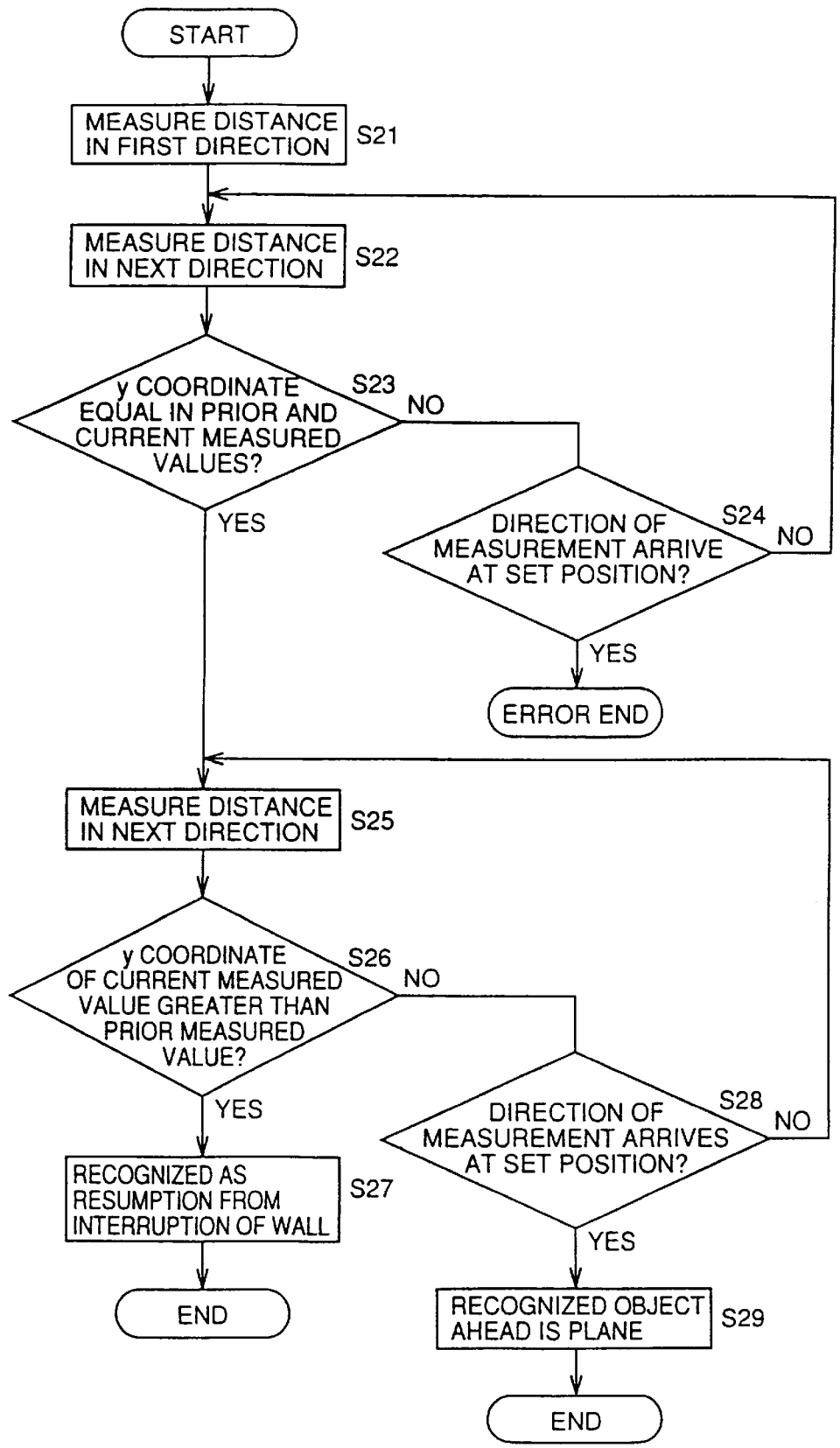
FIG. 24 is a flow chart showing the procedure of recognizing the configuration of an object of interest located ahead.

Referring to FIG. 24, the first measurement ($-45°$ direction) is effected (S21). Here, "measurement" implies obtaining the x and y coordinates. Then, the next measurement is effected by the distance measurement sensor attached at the direction of $+5°$ for the direction of measurement (S22). Determination is made whether the y coordinate of the prior measured result is equal to the y coordinate of the current measured result (S23). This is to determine whether a wall perpendicular to the former wall followed in the tracer run is found or not. More specifically, if the object of interest is perpendicular to the wall that is formerly followed, the continuous y coordinate of the object of interest should be substantially equal. In FIG. 23, the y coordinates corresponding to (3)~(6) are equal.

When the y coordinate of the prior measured result differs from the y coordinate of the current measured result (S23, NO), control proceeds to step S24. Determination is made whether the direction of measurement has arrived at the distance measurement sensor located at a set position ($+45°$). When the direction of measurement has not yet arrived at the set position (S24, NO), control returns to step S22. The direction of measurement is incremented by +5° to carry out the next measurement. When the direction of measurement has arrived at the set position (S24, YES), the process is terminated as an error since an object of interest perpendicular to the former followed wall cannot be detected and that there is no wall that allows return to the tracer travel. If the object of interest is parallel to the former followed wall, the continuous x coordinates of the object of interest resulting from the repetitive measurements of step S22 should be approximately equal. In FIG. 23, the x coordinates are equal at the region corresponding to (1)~(2).

When the y coordinate of the prior measured result is equal to the y coordinate of the current measured result (S23, YES), control proceeds to step S25. At step S25, the direction of measurement is incremented by +5° to carry out the next measurement. Then, determination is made whether the y coordinate of the current measured result is greater than the y coordinate of the prior measured result (S26). This step is provided to determine whether the interruption in the former wall has ended and is resumed, or the wall is still interrupted with a plane ahead.

When determination is made that the y coordinate of the current measured result is greater than the y coordinate of the prior measured result (S26, YES), control proceeds to step S27. At step S27, recognition is made that the interruption in the wall has ended and the wall resumed at the current measured point. This corresponds to the point of (7) in FIG. 23. Then, the process ends.

When determination is made that the y coordinate of the current measured result is not greater than the y coordinate of the prior measured result (S26, NO), control proceeds to step S28. At step S28, determination is made whether the direction of measurement has come to the set position (+45°). When the direction of measurement has not yet arrived at the set position (S28, NO), control returns to step S25. The direction of measurement is incremented by +5° to carry out the next measurement. When the direction of measurement has come to the set position (S28, YES), determination is made that the object located ahead is a plane since recognition cannot be made of resumption from an interruption in the wall (S29). Then, the process ends.

In FIG. 21, the scavenger robot recognizes that there is a concave portion in wall 60 at the left side of the direction of advance, and that there is a wall surface on the line of extension of the wall previously followed for contact-tracer travel. In FIG. 22, the scavenger robot recognizes that there is a wall 60' right in front of the direction of advance of the scavenger robot.

Figure 25:
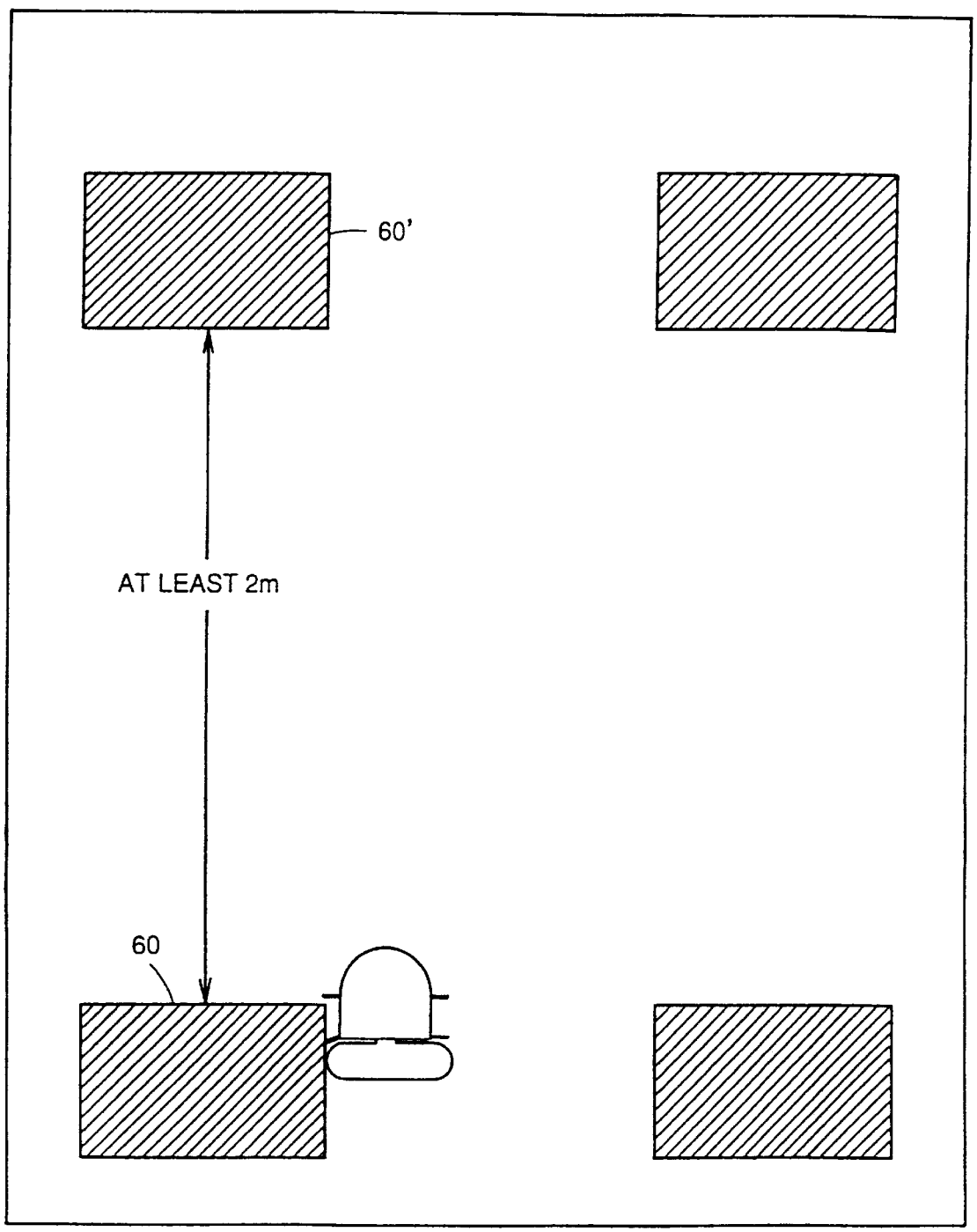
FIG. 25 represents an operation of a scavenger robot of the present invention when the distance from an interruption of a wall to a wall located ahead is at least 2 m.

Then, determination is made whether the interruption of the wall is 2 m or more according to the recognized result obtained at step S6. Although the scavenger robot travels straight ahead by setting equal the revolution and the direction of rotation of wheels 15 and 16 that can be controlled independently, the scavenger robot may run in a slight curving manner despite the equal revolution and direction of rotation of wheels 15 and 16 when the running surface is undulated or when either wheel 15 or 16 slips with respect to the running surface. The straight forward travel accuracy of the scavenger robot has a margin of ±2 cm in the left and right directions for a travel of 2 m. As long as the interruption is not more than 2 m, the scavenger robot can run straight ahead to resume to the contact-tracer travel. When the distance up to the wall 60' ahead is more than 2 m as shown in FIG. 25 (S7, YES), the scavenger robot notifies that a travel straight forward is not allowed and waits for the next instruction (S8). When the interruption in the wall is within 2 m (S7, NO), the configuration of the object of interest located ahead is determined according to the recognized result obtained at step S6.

When there is a wall on the line of extension of the previously followed wall as shown in FIG. 21 (S9, (1)), the scavenger robot runs straight forward until front tracer sensor 40 or 42 comes into contact with the wall (S10). When tracer sensors 40 and 42 do not detect a wall (S11, NO), the scavenger robot runs straight ahead. When tracer sensor 40 or 42 detects a wall (S11, YES), the scavenger robot pauses temporarily (S12), and then proceeds straight forward until rear tracer sensor 41 or 43 detects a wall. The contact-tracer travel is resumed.

When there is a wall 60' right in front ahead as shown in FIG. 22 (S9, (2)), the scavenger robot moves straight ahead up to wall 60' (S14), and waits for the next operation instruction.

Figure 26:
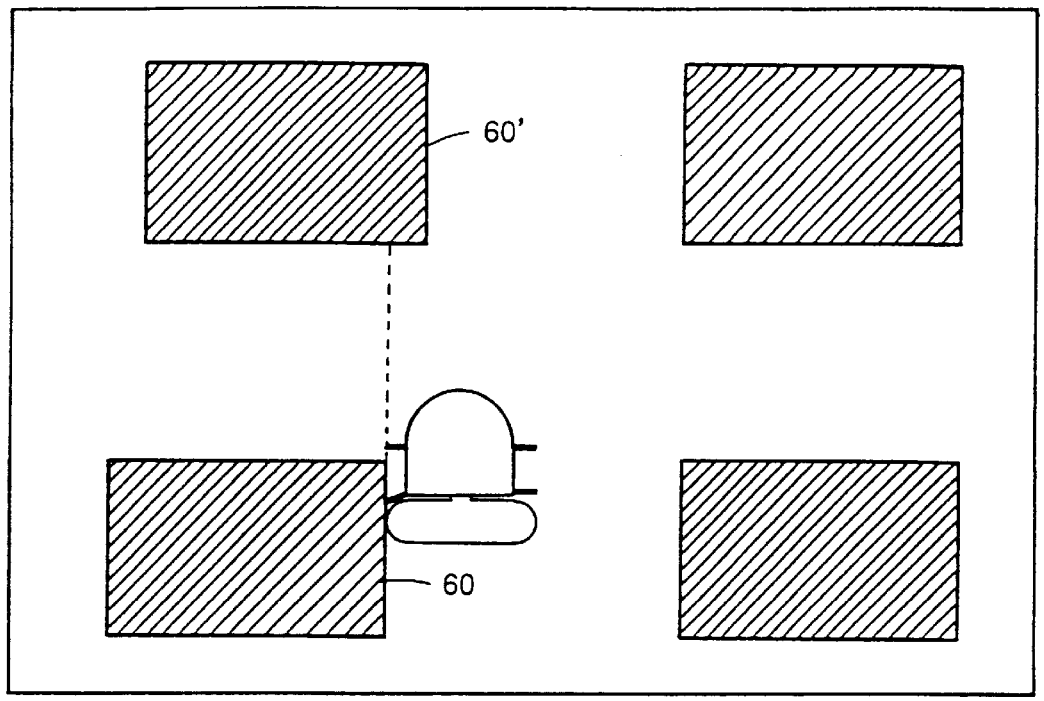
FIG. 26 is a diagram showing the case where a wall located ahead is not on a line of extension of a former wall.
Figure 27:
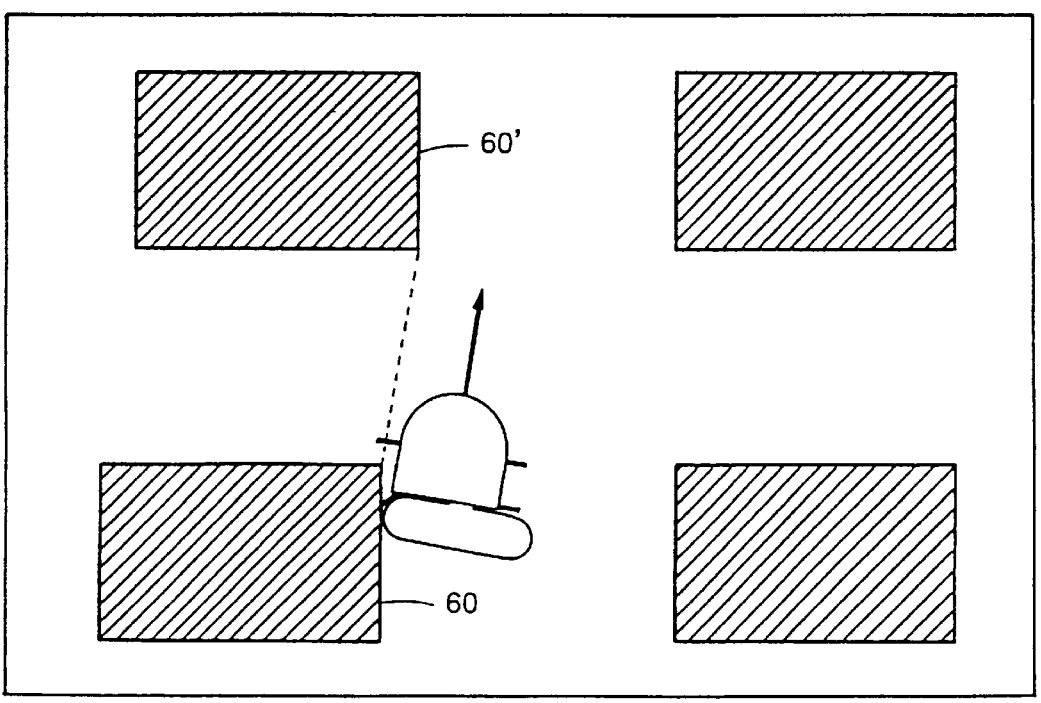
FIG. 27 shows an operation of the scavenger robot according to the first embodiment when the wall located ahead is not found on the line of extension of the former wall.

When there is a wall 60' offset from the line of extension of the previously followed wall 60 as shown in FIG. 26 (S9, (3)), mobile unit 10 is rotated so that the direction of advance of the scavenger robot is parallel to the straight line connecting the corner edge of the interruption of former wall 60 and the corner edge of wall 60' located ahead (S15).

Then, the scavenger robot moves straight ahead until the front tracer sensor 40 or 42 comes into contact with wall (S16). The scavenger robot continues its advance straight ahead when neither tracer sensor 40 nor 42 detects a wall (S17, NO). When tracer sensor 40 or 42 detects a wall (S17, YES), the scavenger robot stops temporarily (S18). Mobile unit 10 is rotated so as to face a direction identical to the previous followed direction along former wall 60 (S19). The scavenger robot proceeds straight forward until the rear tracer sensor 41 or 43 comes into contact with wall 60' (S22). Thus, the contact-tracer travel is resumed.

Second Embodiment

Figure 28:
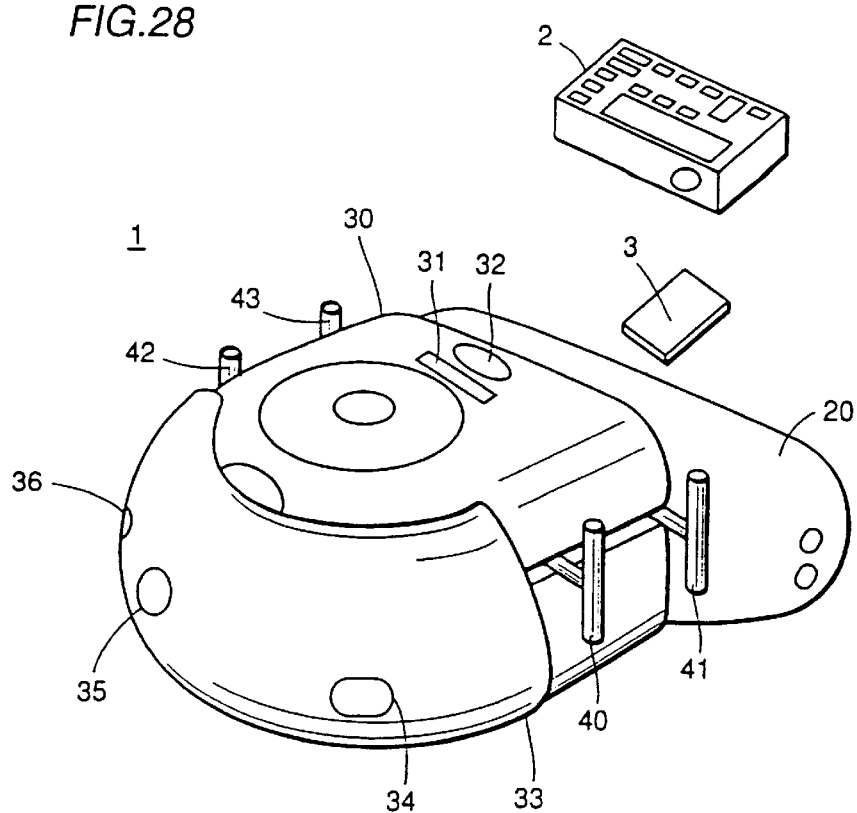
FIG. 28 shows an appearance of a scavenger robot according to a second embodiment of the present invention.

Referring to FIG. 28, the appearance of a scavenger robot according to a second embodiment of the present invention differs only in the configuration of bumper sensor 33 in comparison with the appearance of the scavenger robot of the first embodiment shown in FIG. 5. The scavenger robot of the present embodiment differs from the scavenger robot of the first embodiment described with reference to FIG. 6 in that the plurality of optical distance measurement sensors 36 of FIG. 6 are substituted with three optical distance measurement sensors 37, 38 and 39 in mobile unit 10 of the second embodiment in FIG. 29. The elements in FIG. 29 corresponding to those of FIG. 6 have the same reference characters and designation allotted thereto. Therefore, detailed description thereof will not be repeated.

Optical distance measurement sensor 37 is arranged so as to face the forward direction of the scavenger robot. Optical distance measurement sensors 38 and 39 are arranged facing leftward and rightward, respectively, to the forward direction of the scavenger robot. More specifically, optical distance measurement sensors 37, 38 and 39 are oriented so as to measure the distance in the front, left, and right directions, respectively, with respect to the direction of advance X of the scavenger robot. When tracer travel is to be carried out following a wall, distance measurement sensor 38 or 39, not tracer sensor 40 or 42, can be used to measure the distance to the wall while traveling. An interruption in the wall can be detected when there is a sudden increase in the measured distance.

The operation of the scavenger robot of the second embodiment is similar to the operation in the first embodiment except for the manner of measuring the distance in the forward direction and the manner of recognizing a configuration. Therefore, only the differing elements will be described hereinafter. Respective steps in FIGS. 19 and 20 will be appropriately referred to.

Figure 29:
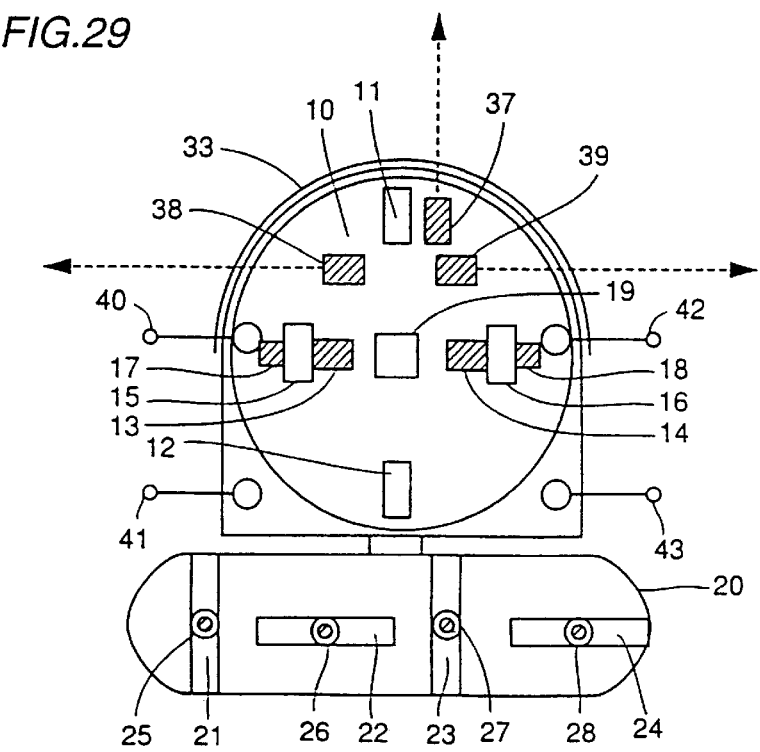
FIG. 29 shows an entire structure of the scavenger robot according to the second embodiment of the present invention.

When the scavenger robot has a structure as shown in FIG. 29, the distance is measured by rotating optical distance measurement sensor 37 by a predetermined angle according to a turn off mobile unit 10 (S5). Mobile unit 10 is rotated on the spot by rotating wheels 15 and 16 attached to mobile unit 10 in opposite directions with the same number of revolutions.

Since there is a possibility that scavenger unit 20 will collide against wall 60 as a result of rotation of mobile unit 10, scavenger unit 20 is rotated by an angle identical to the angle of rotation of mobile unit 10 in an opposite direction to maintain the position of scavenger unit 20 with respect to wall 60. The method of recognizing an object of interest ahead is similar to that previously described with reference to FIG. 24. The next measurement of distance in the subsequent direction in steps S22 and S25 differs only in that the process is carried out by rotating optical measure sensor 37.

Figure 30:
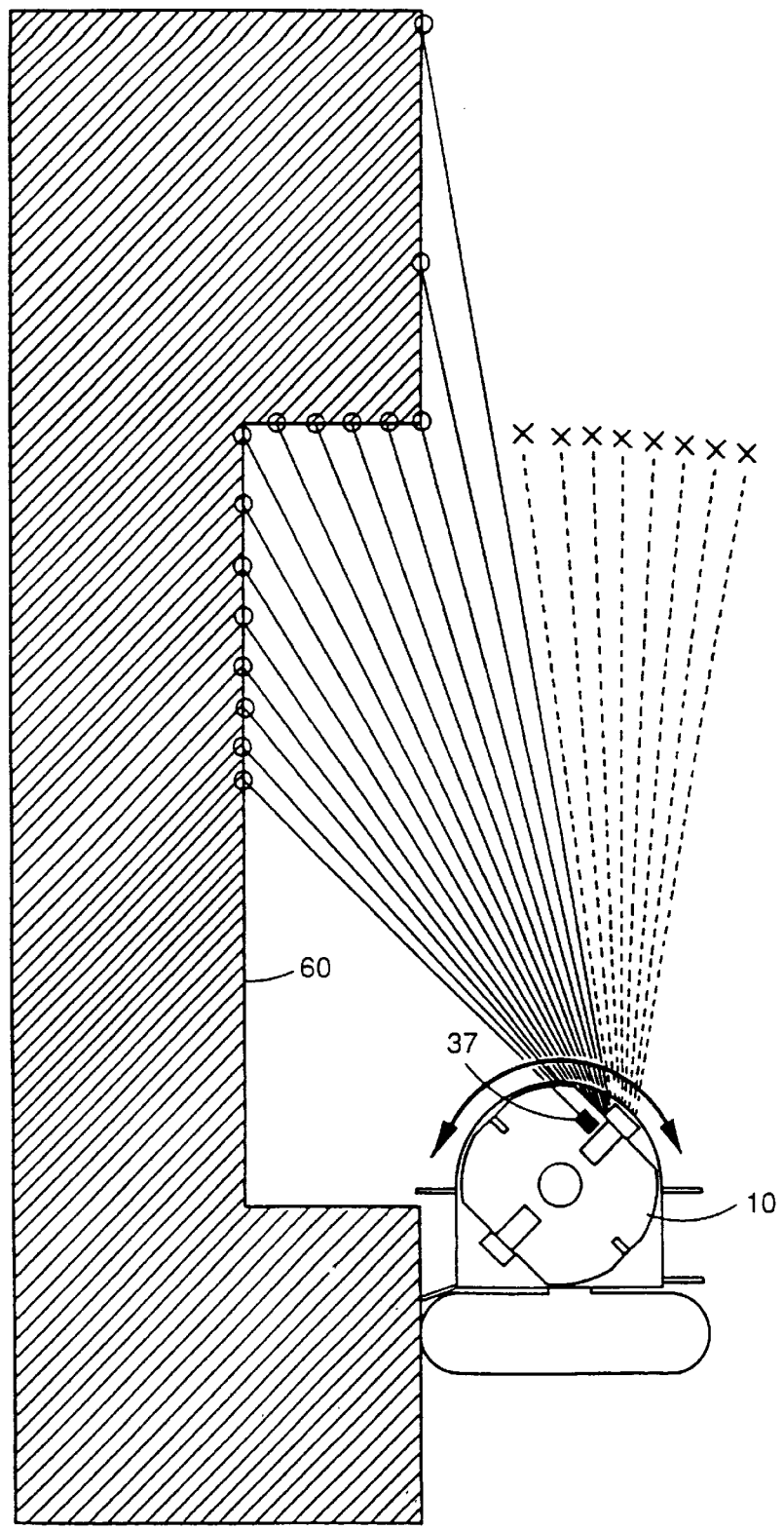
FIG. 30 is a diagram for describing a method of measuring a concave in a wall by the scavenger robot of the second embodiment.

Thus, the distance up to a plurality of points ahead is measured with optical distance measurement sensor 37 while rotating mobile unit 10 by a predetermined angle. In FIG. 30, the distance up to the points marked with an open circle can be measured.

According to the scavenger robot of the structure in FIG. 29, the configuration of an object of interest located ahead is recognized from the distance information of a plurality of points of an object of interest obtained by optical measure distance sensor 37, and the rotated angle of optical distance measure distance 37 as shown in FIG. 30. In FIG. 30, the scavenger robot recognizes that there is a concave portion in wall 60 leftward of the direction of advance, as in FIG. 21, and that there is a wall on the line of extension with respect to the former followed wall.

Although an optical distance measurement sensor is used in the present embodiment, a supersonic sensor can be used instead.

According to the first and second embodiments, the configuration of an object of interest located ahead can be recognized in advance even when an interruption in a wall is detected during a tracer travel following a wall. It is therefore possible to identify whether the tracer travel can be continued or not beforehand.

Since the distance up to an object of interest located ahead is measured using a plurality of distance measurement sensors oriented in a radial manner, the configuration of an object of interest located ahead can be recognized in a short time. Thus, a scavenger robot superior in operation speed can be provided.

The scavenger robot can be formed with the minimum number of distance measurement sensors to recognize the configuration of an object of interest located ahead by rotating the distance measurement sensor. Thus, a scavenger robot that is improved in the aspect of cost can be provided.

Third Embodiment

The scavenger robot of a third embodiment of the present invention has an appearance and structure identical to those of the scavenger robot described with reference to FIGS. 28 and 29. Therefore, details thereof will not be repeated.

First and second operations carried out by the scavenger robot of the third embodiment will be described hereinafter. The first operation is carried out by the scavenger robot in commencing a zigzag travel over a set rectangle region. The second operation of the scavenger robot is carried out when a region differing from the set region is detected during a scavenge operation in the set region.

The procedure of the first operation is as set forth in (1)–(7). The first operation is achieved under control of operation unit CPU 101 and mobile unit CPU 121. Although the following case is described for a work area enclosed by a wall, the present scavenger robot can be applied to the cases where there are walls at either sides, or when the work area is open.

(1) Scavenger robot unit 1 is set at a point A which is one corner of a rectangle region (work area).

(2) Provide the setting of a zigzag travel over the rectangle region to be covered by the scavenger robot.

(3) Provide the designation to commence the operation by the scavenger robot.

(4) In response to the operation start instruction of (3), the scavenger robot measures the dimension of the rectangle region (distances L1 and L2 in FIG. 31A) using frontward distance measurement sensor 37, left side distance measurement sensor 38 and right side distance measurement sensor 39.

(5) Compare the lengths of L1 and L2.

(6) The direction corresponding to the greater values of L1 and L2 is set as the direction of advance.

(7) Alter the direction of advance, if necessary, according to the determined direction of advance of (6), and proceed a zigzag travel to point B.

Figure 31A:
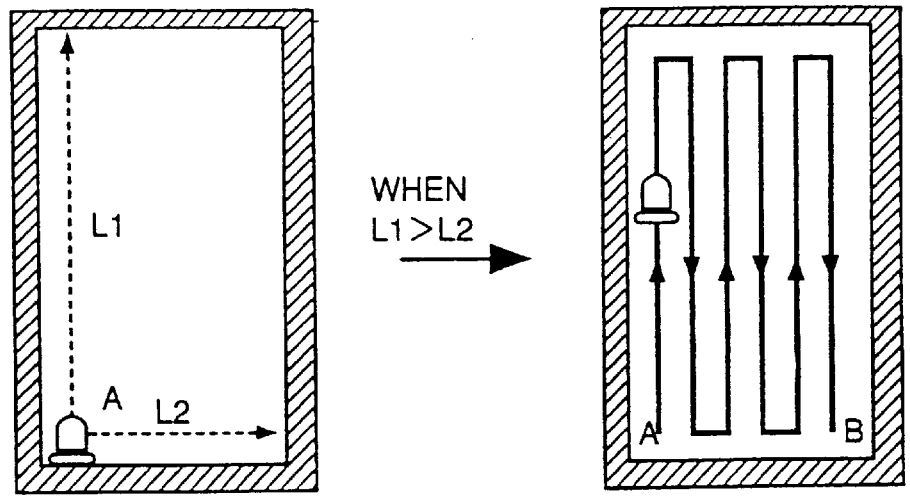
FIGS. 31A and 31B show the procedure of a first operation.
Figure 31B:
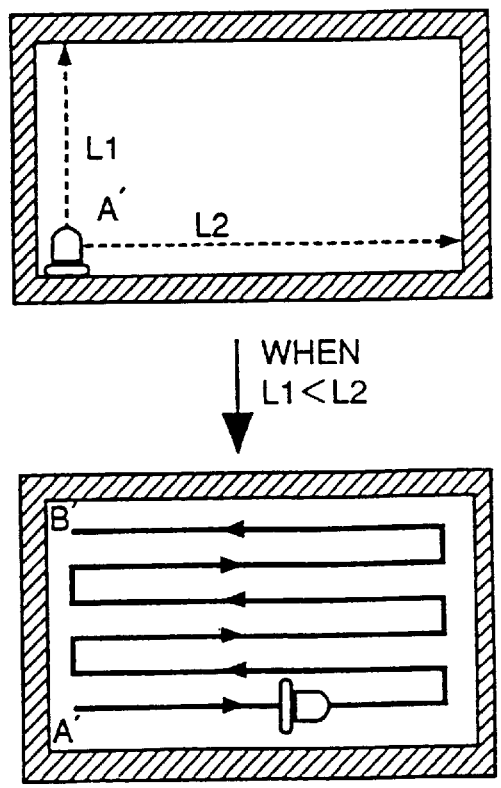

FIG. 31A corresponds to the case where L1>L2. The scavenger robot directly advances straight forward in the direction initially set by the user (the direction corresponding to L1) to cover the work area in a zigzag manner. FIG. 31B corresponds to the case where L1<L2. The scavenger robot alters the direction 90 degrees (the direction corresponding to L2) from the direction initially set by the user (the direction corresponding to L1). Then, the scavenger robot moves straight forward to cover the rectangle region in a zigzag manner.

By the above-described first operation of the scavenger robot, the total running time of the robot over the work area can be reduced.

Figure 32:
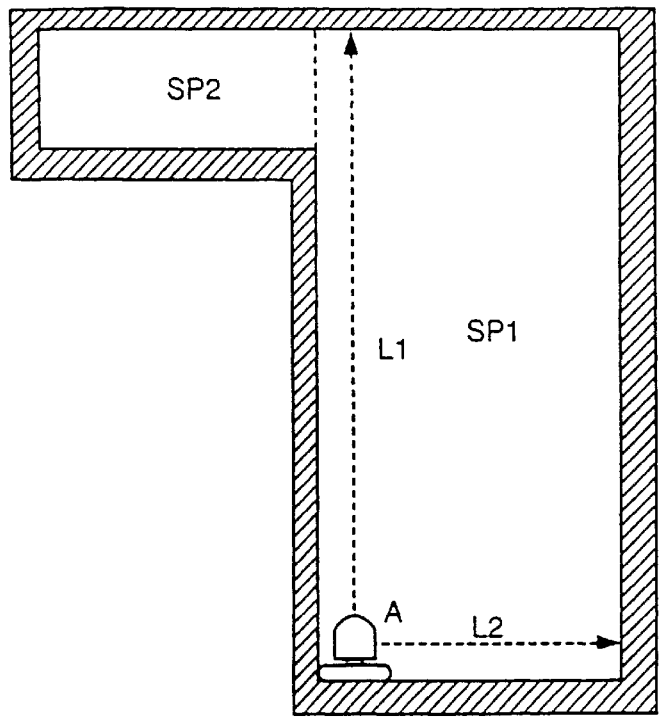
FIGS. 32–35 are diagrams for describing an operation of a scavenger robot in a work area of a first configuration.

FIG. 32 shows a work area of a first configuration. The work area includes a rectangle region SP1 and an adjacent rectangle region SP2. Scavenger robot unit 1 is located at point A which is one corner of rectangle region SP1. The longer side of rectangle region SP1 is perpendicular to a longer side of rectangle region SP2.

The procedure of the second operation is set forth below in (1)–(11). The second operation is achieved under control of operation unit CPU 101 and mobile unit CPU 121. At the start of the work operation, measurement of the dimension of the rectangle region, comparison of the length of respective sides of the rectangle, and selection of the direction of advance described in the first operation are carried out. Although description is provided for a work area enclosed by a wall as in the first operation, the scavenger robot can be applied to the case where the work area has walls on either side, or where the work area is open.

(1) Scavenger robot unit 1 is placed at a point A at one corner of rectangle region S1 (FIG. 32).

(2) Provide the setting of a zigzag travel over rectangle region SP1 for the scavenger robot.

(3) Provide the instruction to commence the work operation.

(4) In response to an operation start instruction of (3), the scavenger robot measures the dimension of the rectangle region (distance L1, L2), compares L1 and L2, selects the direction corresponding to L1 as the direction of advance, and commences a zigzag travel.

(5) The scavenger robot moves straight ahead following the wall while measuring the distance up to the left and right walls.

Figure 33:
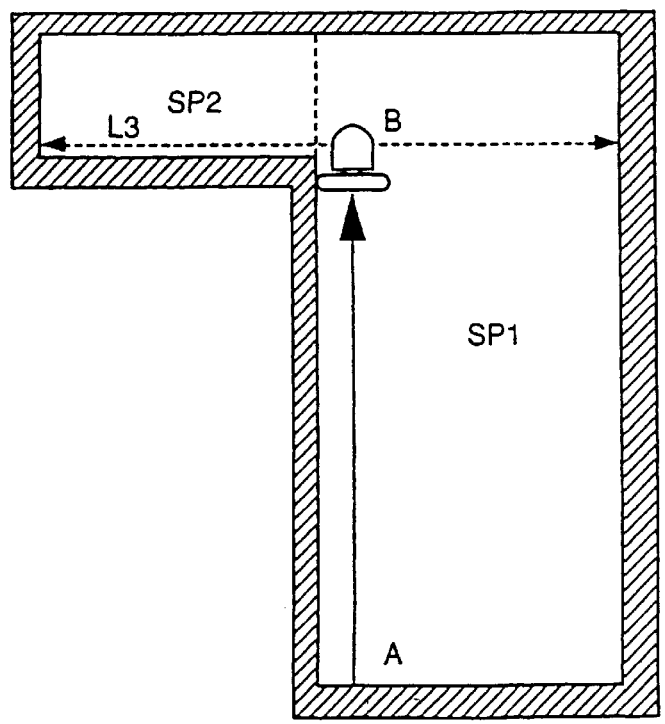

(6) Upon arriving at point B (refer to FIG. 33), a concave in the wall (region SP2) is detected by the sudden increase in the measured value of the horizontal direction distance measurement sensor (left distance measurement sensor 38).

(7) The depth of the concave in the wall (distance L3) is stored.

(8) The direction of advance is altered to the direction towards the concave in the wall (the direction corresponding to distance L3). The scavenger robot proceeds straight ahead while measuring the distance up to the left and right walls in rectangle region SP2.

Figure 34:
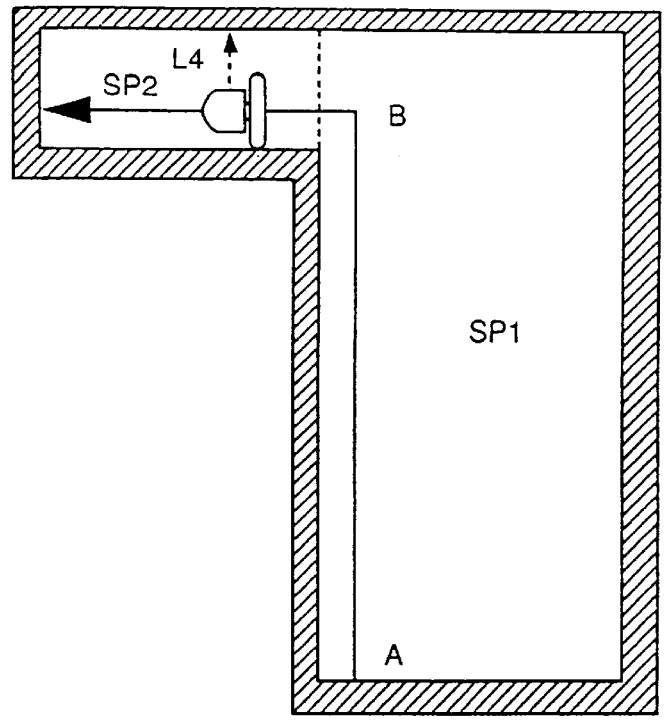

(9) Distance L4 determining the dimension of rectangle region SP2 is compared with the stored value of distance L3 (refer to FIG. 34).

(10) The direction corresponding to the greater of L3 and L4 (in FIG. 33, the direction corresponding to L3) according to the comparison in (9) is set as the direction of advance for the scavenger robot. The scavenger robot travels in a zigzag manner over rectangle region SP2.

Figure 35:
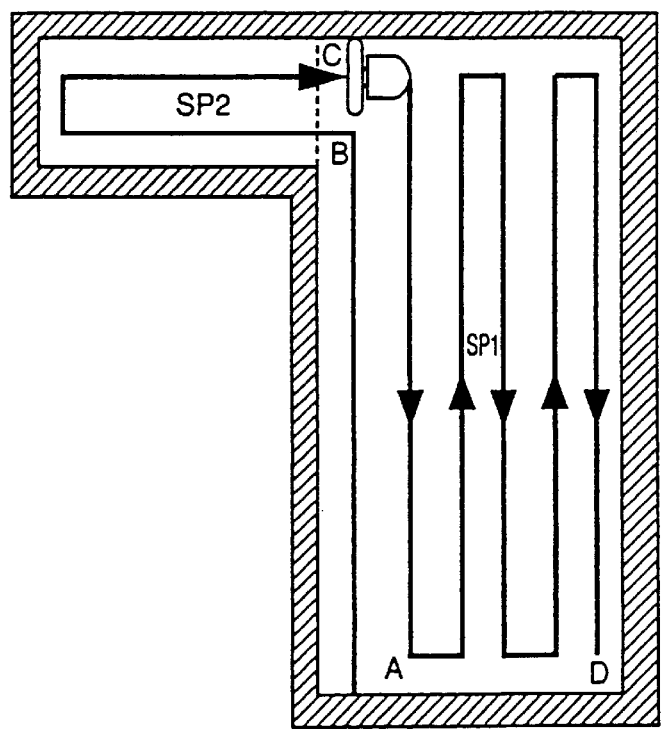

(11) When the scavenger robot arrives at point C after covering rectangle region SP2 in a zigzag manner (refer to FIG. 35), the scavenger robot recommences the zigzag travel in rectangle region SP1 to continue the zigzag travel until point D.

Although the value of distance L3 is the detected value from horizontal distance measurement sensor, the traveled distance until coming into contact with the wall in the direction corresponding to L3 can be used instead.

Figure 36:
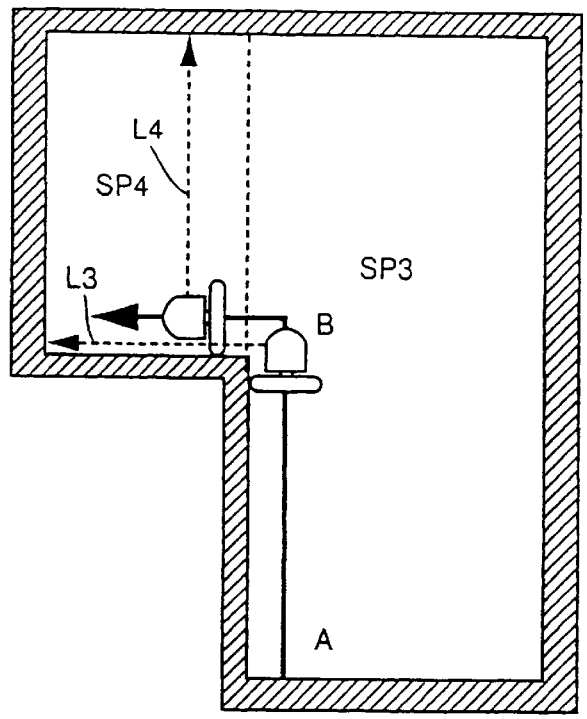
FIGS. 36–37 are diagrams for describing an operation of a scavenger robot in a work area of a second configuration.

FIG. 36 shows a work area of a second configuration. The present work area includes a rectangle region SP3 and a rectangle region SP4. Scavenger robot unit 1 is placed at a point A at one corner of rectangle region SP3. The longer side of rectangle region SP3 is parallel to the longer side of rectangle region SP4.

The second operation of the scavenger robot in the work area of the second configuration includes the procedure of (1)–(9) similar to that for the work area of the first configuration. When the scavenger robot enters rectangle region SP4 by these operations, the following operations are carried out.

(10) The direction corresponding to the greater of L3 and L4 according to the comparison of (9) (the direction corresponding to L4 in FIG. 36) is set as the direction of advance (refer to FIG. 36). The scavenger robot proceeds in a zigzag manner in rectangle region SP4.

Figure 37:
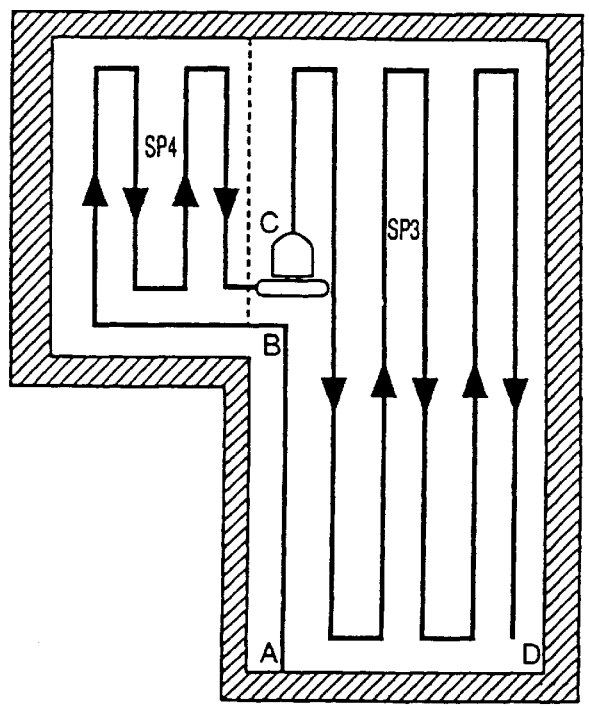

(11) When the scavenger robot completes its zigzag travel in rectangle region SP4 and arrives at point C (refer to FIG. 37), the scavenger robot reinitiates its zigzag travel in rectangle region SP3 to arrive at point D.

Figure 38:
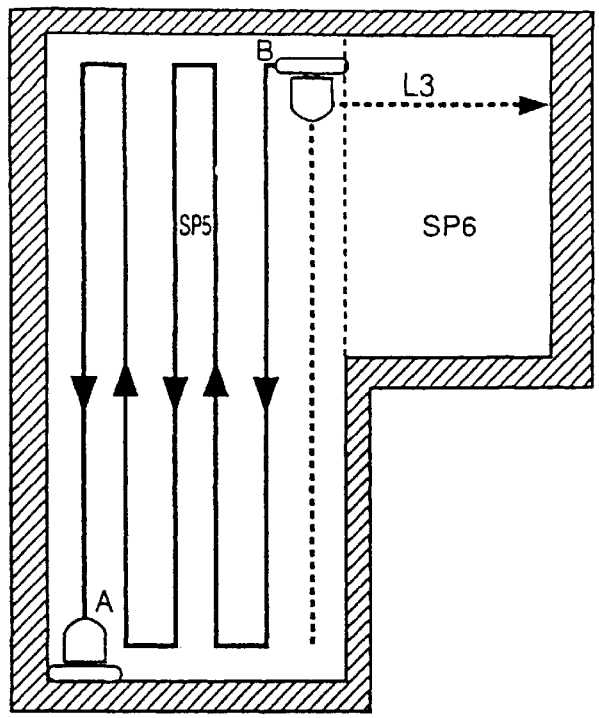
FIGS. 38–40 are diagrams for describing an operation of a scavenger robot in a work area of a third configuration.

FIG. 38 shows a work area of a third configuration. Similar to the work area of the second configuration, the work area of the third configuration includes two adjacent rectangle regions SP5 and SP6 with the longer side of each region parallel to each other. It is to be noted that scavenger robot unit is initially set at a point remote from the joining area of the rectangle region (point A in FIG. 38).

The second operation of the scavenger robot in the work area of the third configuration will be described hereinafter.

The procedure from (1) to (5) is identical to the procedure in the work areas of the first and second configuration. When the scavenger robot arrives at point B in rectangle region SP5, the following operations are carried out.

(6) Upon arriving at point B (refer to FIG. 38), a concave in the wall (region SP6) differing from rectangle region SP5 which is the set region is detected by the horizontal distance measurement sensor (left distance measurement sensor 38).

(7) The depth of the concave in the wall (distance L3) is stored.

(8) The direction is altered towards the concave of the wall (the direction corresponding to distance L3). The scavenger robot proceeds straight forward while measuring the distance to the left and right walls in rectangle region S6.

Figure 39:
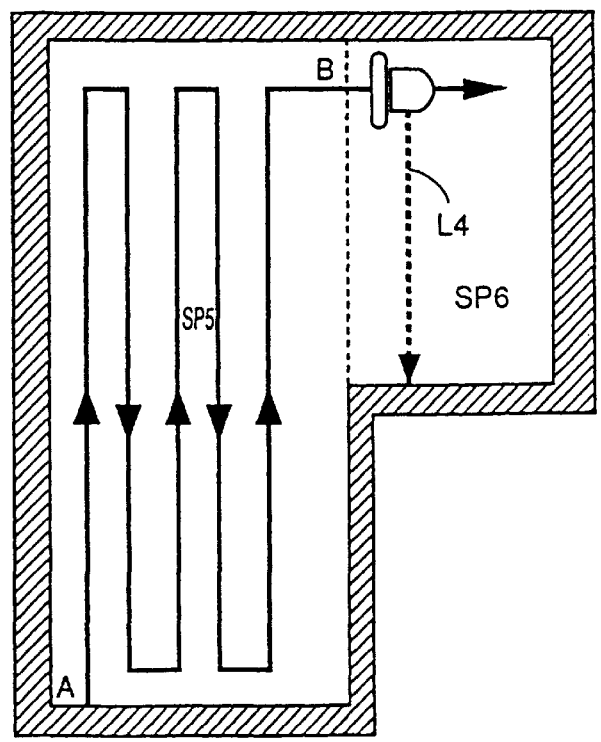

(9) Distance L4 determining the dimension of rectangle region S6 is compared with the stored value of L3 (refer to FIG. 39).

(10) The direction corresponding to the greater values of L3 and L4 according to the comparison of (9) (the direction corresponding to L4 in FIG. 39) is set as the direction of advance. The scavenger robot carries out a zigzag travel in rectangle region SP6.

Figure 40:
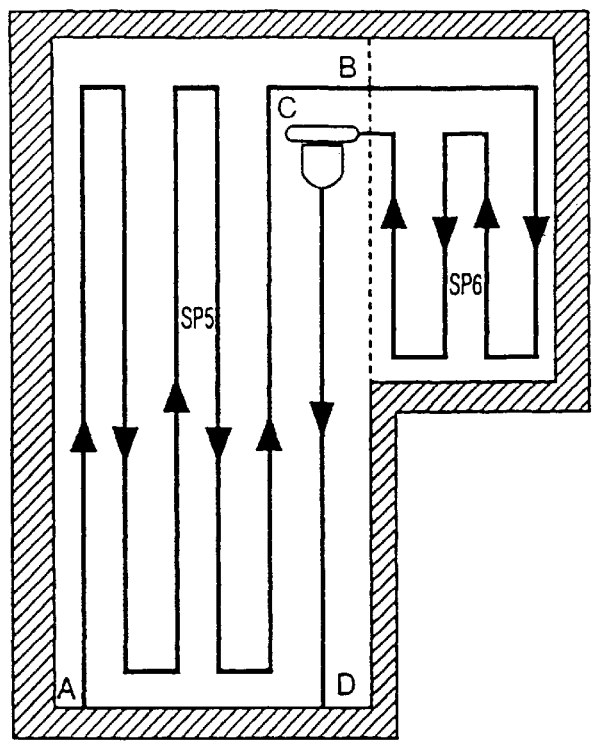

(11) When the scavenger robot arrives at point C (refer to FIG. 40) after covering rectangle region SP6 in a zigzag manner, the scavenger robot recommences the zigzag travel in rectangle region SP5. The zigzag travel is terminated when the scavenger robot reaches point D.

Figure 41:
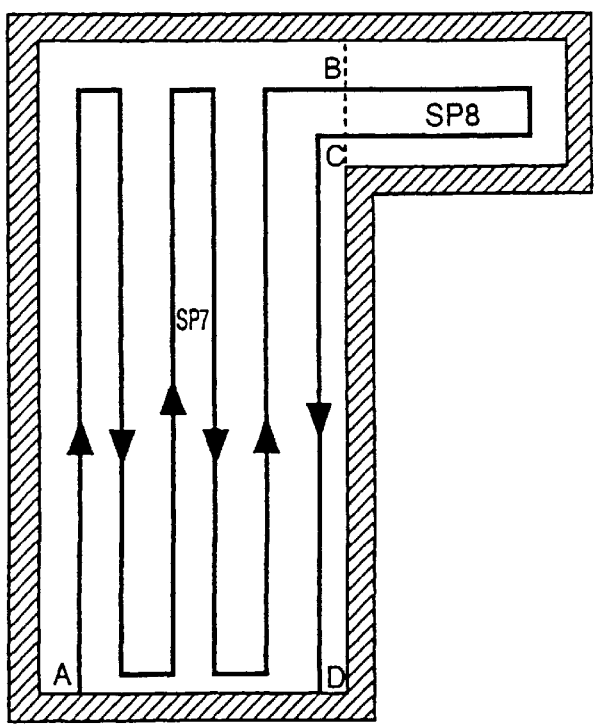
FIG. 41 is a diagram for describing an operation of a scavenger robot in a work area of a fourth configuration.

FIG. 41 shows a work area of a fourth configuration. Similar to the work area of the first configuration, the work area of the fourth configuration includes two adjacent rectangle regions SP7 and SP8 having the longer sides of respective regions perpendicular to each other. It is to be noted that scavenger robot unit 1 is initially set at a point (point A in FIG. 41) remote from the joining region in the rectangle region.

The second operation of the scavenger robot in the work area of the fourth configuration will be described hereinafter. The procedure from (1) to (11) is similar to that of work area of the third configuration. However, since the length in the direction of depth of the concave corresponds to the longer side of rectangle region SP8, a commensurate operation is carried out.

Figure 42:
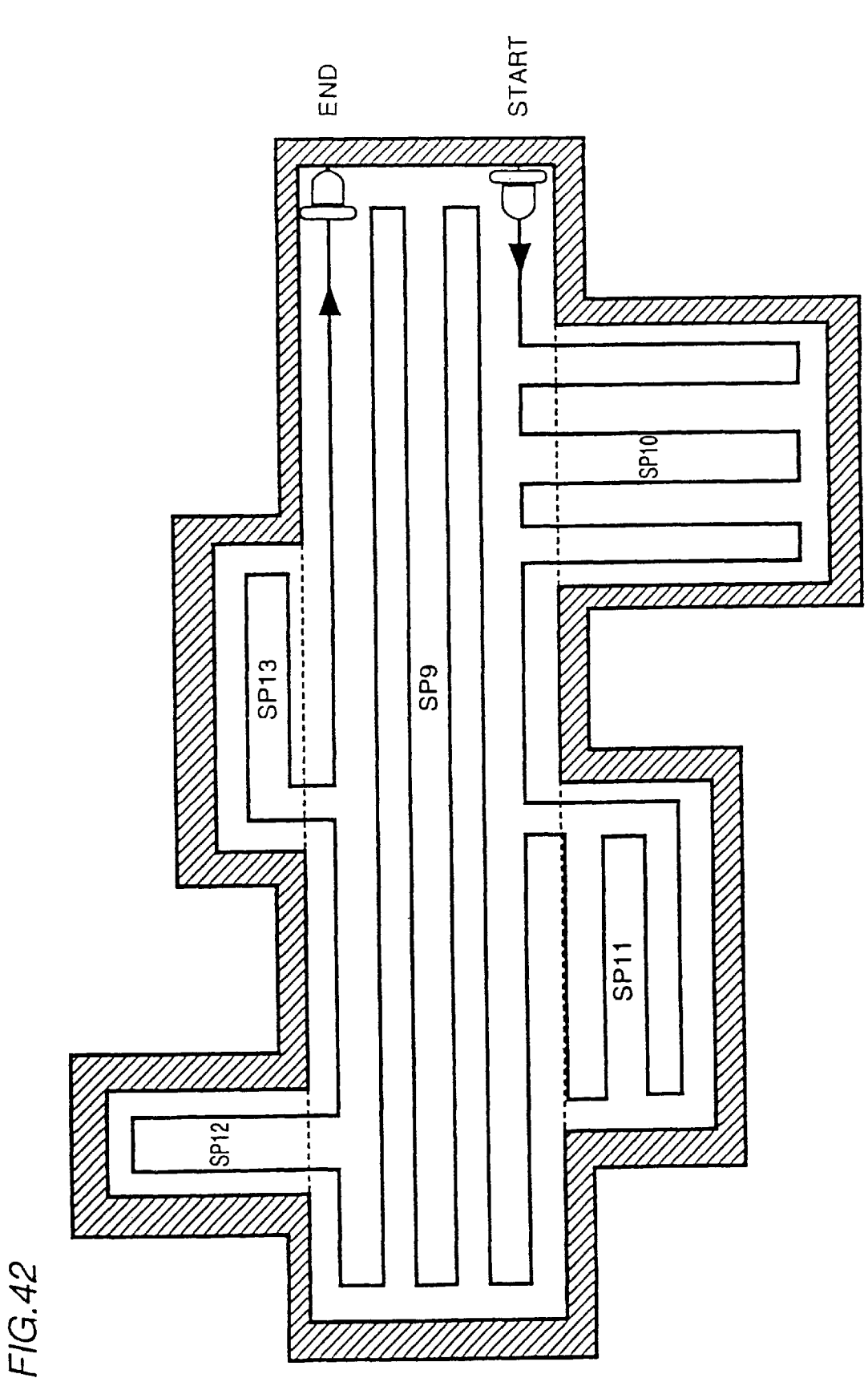
FIG. 42 is a diagram for describing an operation of a scavenger robot in a work area of a fifth configuration.

Although the work areas of the first to fourth configurations have two rectangle regions joined, the scavenger robot of the present invention can cover a work area in a zigzag manner having three or more rectangle regions joined together. FIG. 42 shows such a work area (the fifth work area) and the movement of the scavenger robot.

Referring to FIG. 42, the work area of the fifth configuration includes rectangle regions SP9, SP10, SP11, SP12 and SP13. By setting a zigzag travel for rectangle region SP9, the scavenger robot detects the other rectangle regions SP10, SP11, SP12, and SP13 to proceed in a zigzag manner according to the configuration of each rectangle region.

According to the above-described second operation of the scavenger robot, the user no longer has to set additional regions differing from the set region. Thus, the burden on the user for the operation is alleviated.

Computation of the dimension value of a rectangle region by measurement can be achieved more accurately by including corrections according to the dimension of the scavenger robot and measured values of a distance in another direction on the basis of the position relationship between the scavenger robot and the wall, and the direction of the distance measurement.

FIGS. 43–46 are diagrams for describing the computation of the dimension of a rectangle region. Here, distance $L_L$ and $L_R$ to the left and right walls, respectively, is a corrected value of the distance from the center of the robot to the wall, corresponding to the distance from the attached position of the distance measurement sensor to the center of the robot plus the measured value by the distance measurement sensor.

Figure 43:
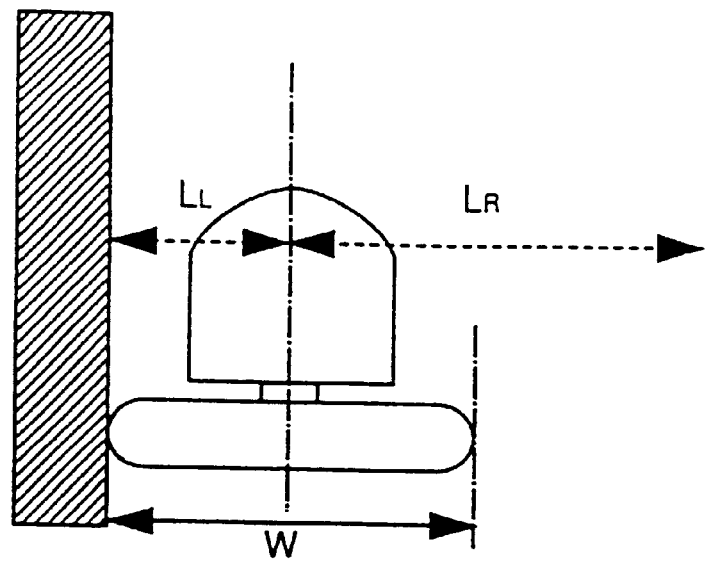
FIGS. 43–46 are diagrams for describing the calculation of the dimension of a rectangle region.

Referring to FIG. 43, the scavenger robot measures the right direction while following the left wall. The dimension of the rectangle region can be represented by the following equation where $L_L$ is the left side measured value, $L_R$ is the right side measured value, and W is the width of the scavenger robot. (Dimension value)=$L_R$+W/2, or (dimension value)=$L_R$+$L_L$. This dimension value is used in measuring, for example, the distance L2 in FIG. 32.

Figure 44:
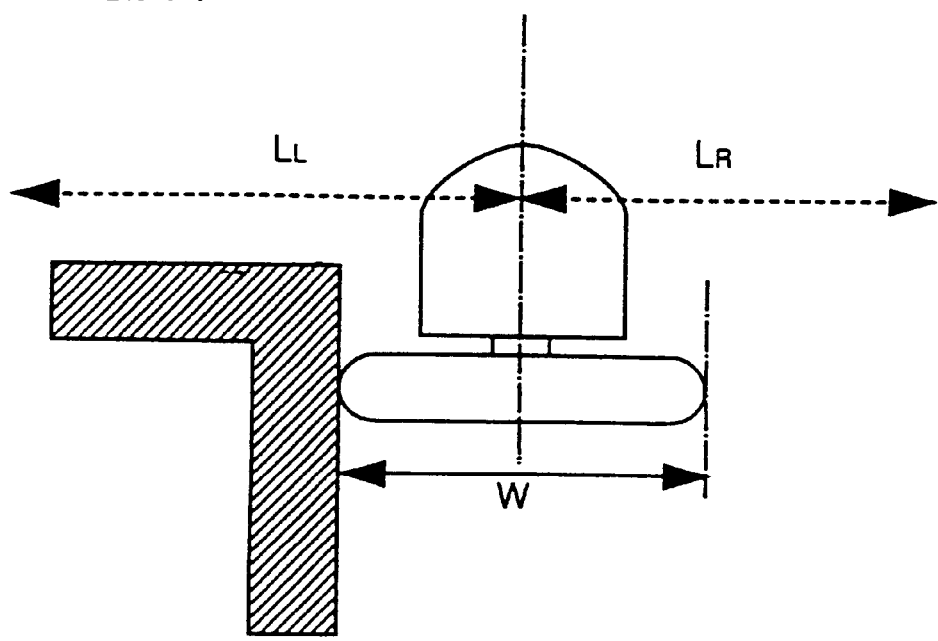

Referring to FIG. 44, the scavenger robot measures the distance to the left and right walls while following the left wall. In this case, the dimension value in the left direction can be represented by (dimension value)=$L_L$−W/2. This dimension value is used for measuring, for example, the distance L3 in FIG. 33.

Figure 45:
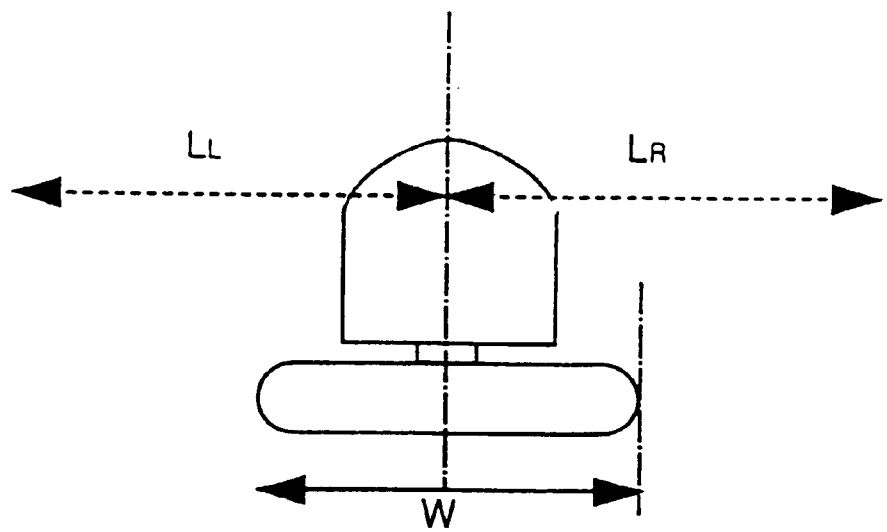

FIG. 45 represents a diagram for describing the calculation of the dimension of a rectangle region when the scavenger robot measures the distance in the horizontal direction without following either side of the wall. In this case, the dimension is represented as (dimension value)=$L_R$+$L_L$.

Figure 46:
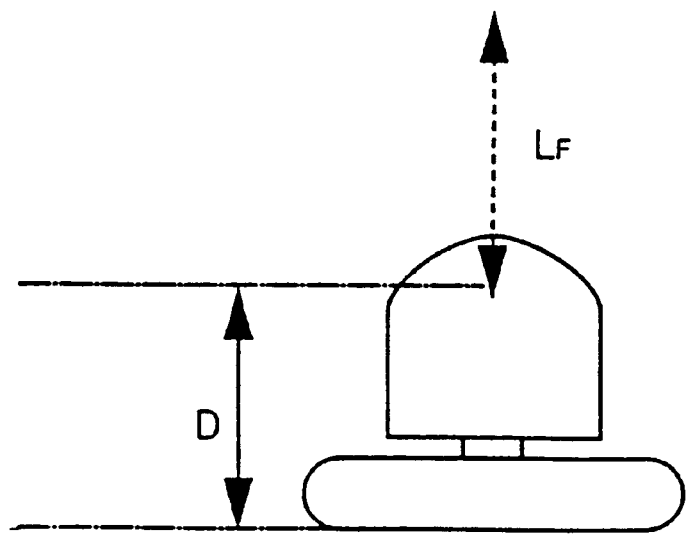

FIG. 46 is a diagram for describing calculation of the dimension of a rectangle region when the scavenger robot carries out measurement in the vertical direction.

When the front distance measured value is $L_F$ and the length from the attached position of the front distance measurement sensor to the rear side of the scavenger robot is D, the dimension value of a rectangle region can be represented by (dimension value)=$L_F$+D. This dimension value can be used for measuring, for example, the length L1 in FIG. 32.

By providing a set unit for setting the dimension of a work area in the scavenger robot, the sensor for measuring the distance by having the user set the dimension of a work area can be eliminated. Thus, the structure of a scavenger robot can be simplified. This setting unit is required when the work area corresponds to open state not enclosed by a wall and the like.

When the measured distance in two directions is identical, either direction can be set as the direction of advance taking into consideration the computation of a more accurate dimension value of a rectangle region, as described with reference to FIGS. 43–46.

The work area in the present embodiment is described to be a rectangle region or a region with combined rectangles. The present invention is also applicable to regions having a parallelogram or triangle configuration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An autonomous vehicle that runs following an object of interest in a tracer travel manner, comprising:

a tracer sensor for detecting a tracer status with respect to said object of interest, a configuration measurement unit for measuring a configuration of an object of interest located ahead when said tracer sensor detects an interruption in said former object of interest, and a drive unit for carrying out a predetermined operation according to the configuration measured by said configuration measurement unit.

2. The autonomous vehicle according to claim 1, wherein said configuration measurement unit includes a plurality of distance measurement sensors arranged radially for measuring a distance to said object of interest located ahead.

3. The autonomous vehicle according to claim 2, wherein said distance measurement sensor is an optical distance measurement sensor including a light emitting unit and a light receiving unit.

4. The autonomous vehicle according to claim 1, wherein said configuration measurement unit includes a distance measurement sensor that is moved for measuring a distance up to a plurality of points of said object of interest located ahead.

5. The autonomous vehicle according to claim 4, wherein said distance measurement sensor rotates to sequentially measure a distance to said object of interest located ahead.

6. The autonomous vehicle according to claim 1, wherein said autonomous vehicle is a scavenger vehicle that scavenges a running surface.

7. The autonomous vehicle according to claim 1, wherein said tracer sensor senses a distance to an object of interest with a contact type sensor.

8. The autonomous vehicle according to claim 1, wherein said configuration measure unit commences measurement from a position turned 45 degrees towards a side where a tracer travel is carried out following an object of interest in a direction of advance.

9. A method of selecting a route of advance of an autonomous vehicle that runs following an object of interest in a tracer travel manner, comprising the steps of:

detecting an interruption in said object of interest that is followed in a tracer travel manner, measuring a configuration of an object of interest located ahead, and determining a direction of advance according to said measured result.

10. The method of selecting a route of an autonomous vehicle according to claim 9, further comprising the step of stopping the autonomous vehicle when in a status difficult for autonomous travel according to said measured result, and notifying the stop to a user.

11. The method of selecting a route of an autonomous vehicle according to claim 9, wherein said step set of measuring a configuration includes the step of recognizing the configuration by measuring a distance to a plurality of locations.

* * * * *